United States Patent [19]

Hashimoto et al.

[11] Patent Number: 4,916,039
[45] Date of Patent: Apr. 10, 1990

[54] ELECTROPHOTOGRAPHIC PHOTOCONDUCTOR

[75] Inventors: Mitsuru Hashimoto, Numazu; Masaomi Sasaki, Susono, both of Japan

[73] Assignee: Ricoh Company, Ltd., Tokyo, Japan

[21] Appl. No.: 216,340

[22] Filed: Jul. 8, 1988

[30] Foreign Application Priority Data

Jul. 8, 1987 [JP] Japan .................. 62-171625
Jul. 17, 1987 [JP] Japan .................. 62-178777

[51] Int. Cl.$^4$ ............................... G03G 5/14
[52] U.S. Cl. .......................... 430/57; 430/72; 430/78
[58] Field of Search ............... 430/79, 72, 78, 57

[56] References Cited

U.S. PATENT DOCUMENTS 4,507,471  3/1985  Ohta .................... 430/58 X
4,599,287  7/1986  Fujimaki et al. ........... 430/59
4,600,674  7/1986  Emoto .................. 430/58 X

FOREIGN PATENT DOCUMENTS 62-147463  7/1987  Japan .

Primary Examiner—J. David Welsh
Attorney, Agent, or Firm—Oblon, Spivak, McClelland, Maier & Neustadt

[57] ABSTRACT

An electrophotographic photoconductor is disclosed which comprises an electroconductive support and a photoconductive layer formed thereon, which photoconductive layer comprises as a charge generating material an azo pigment having general formula (I):

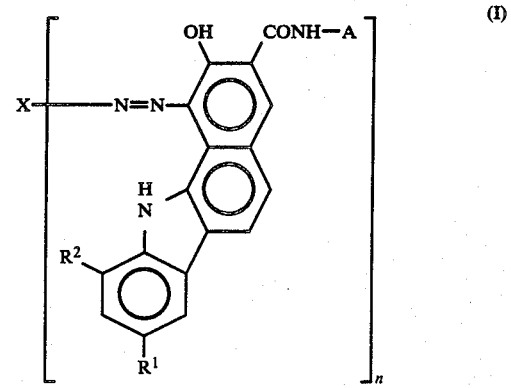

wherein $R^1$, $R^2$, X, A and n are respectively defined in the specification.

5 Claims, 2 Drawing Sheets

ELECTROPHOTOGRAPHIC PHOTOCONDUCTOR

BACKGROUND OF THE INVENTION

The present invention relates to an electrophotographic photoconductor comprising an electroconductive support and a photoconductive layer comprising a particular azo pigment as charge generating layer which generates charge carries when exposed to light.

Conventionally, a variety of inorganic and organic electrophotographic photoconductors are known. As inorganic electrophotographic photoconductors, there are known, for instance, a selenium photoconductor, a selenium-alloy photoconductor, and a zinc oxide photoconductor which is prepared by sensitizing zinc oxide with a sensitizer pigment and dispersing the same in a binder resin. Furthermore, as a representative example of organic electrophotographic photoconductors, an electrophotographic photoconductor comprising a charge transporting complex of 2,4,7-trinitro-9-fluorenone and poly-N-vinylcarbazole is known.

However, while these electrophotographic photoconductors have many advantages over other conventional electrophotographic photoconductors, at the same time they have several shortcomings from the viewpoint of practical use.

For instance, a selenium photoconductor which is widely used at present has the shortcoming that its production is difficult and, accordingly, its production cost is high, and it is difficult to work into the form of a belt due to its poor flexibility. Furthermore, it is so vulnerable to heat and mechanical shock that it must be handled with the utmost care.

In contrast to this, the zinc oxide photoconductor is inexpensive since it can be produced more easily than the selenium photoconductor. Specifically, it can be produced by simply coating inexpensive zinc oxide particles on a support. However, it is poor in photosensitivity, surface smoothness, hardness, tensile strength and wear resistance. Therefore, it is not suitable for a photoconductor for use in plain paper copiers in which the photoconductor is used in quick repetition.

The photoconductor employing the aforementioned complex of 2,4,7-trinitro-9-fluorenone and poly-N-vinylcarbazole is also poor in photosensitivity and therefore not suitable for practical use, particularly for a high speed copying machine.

Recently, extensive studies have been done on the electrophotographic photoconductors of the above-mentioned types, in order to eliminate the above-described shortcomings of the conventional photoconductors. In particular, attention has focused on layered organic electrophotographic photoconductors, each comprising an electroconductive support, a charge generation layer comprising an organic pigment formed on the electroconductive support, and a charge transport layer comprising a charge transporting material formed on the charge generation layer, which are for use in plain paper copiers, since such layered organic photoconductors have high photosensitivity and stable charging properties. As a matter of fact, several types of layered electrophotographic photoconductors are being successfully used in practice. Examples of the layered electrophotographic photoconductors are as follows:

(1) A layered type electrophotographic photoconductor whose charge generation layer comprises a perylene derivative and whose charge transport layer comprises an oxadiazole derivative disclosed in U.S. Pat. No. 3,871,882.

(2) A layered type electrophotographic photoconductor whose charge generation layer comprises Chlorodiane Blue which is dispersed in an organic amine solution and coated on an electroconductive support and whose charge transfer layer comprises a pyrazoline derivative disclosed in Japanese Patent Publication No. 5542380.

(3) A layered type electrophotographic photoconductor whose charge generation layer comprises a distyrylbenzene type bisazo pigment dispersed in organic solvent and coated on an electroconductive support, and whose charge transport layer comprises a hydrazone compound disclosed in Japanese Laid-Open Patent Application No. 5584943.

As mentioned previously, these layered type electrophotographic photoconductors have many advantages over other electrophotographic photoconductors, but at the same time, they have various shortcomings.

Specifically, the electrophotographic photoconductor (1) employing a perylene derivative and an oxadiazole derivative presents no problem for use in an ordinary electrophotographic copying machine, but its photosensitivity is insufficient for use in a high speed electrophotographic copying machine. Furthermore, since the perylene derivative, which is a charge generating material and has the function of controlling the spectral sensitivity of the photoconductor, does not necessarily have spectral absorbance in the entire visible region, this photoconductor is not suitable for use in color copiers.

The electrophotographic photoconductor (2) employing Chlorodiane Blue and a pyrazoline derivative exhibits comparatively good photosensitivity. However, when preparing this photoconductor, an organic amine, for example, ethylene diamine, which is difficult to handle, is necessary as a coating solvent for forming the charge generation layer.

The electrophotographic photoconductor (3) employing a distyryl benzene type bisazo compound and a hydrazone compound have an advantage over other conventional electrophotographic photoconductors in that the charge generation layer can be prepared easily by coating a dispersion of the bisazo pigment on an electroconductive support. However, the photosensitivity of the photoconductor is too low to use as a photoconductor for high speed electrophotographic copying machine.

Furthermore, recently there is a demand for a photoconductor for use in laser printers, in particular for a highly sensitive photoconductor having a photosensitivity in a semiconductor laser wavelength region.

The above-mentioned photoconductors, however, have too low a photosensitivity to use in practice for semiconductor laser.

SUMMARY OF THE INVENTION

It is therefore an object of the present invention to provide an electrophotographic photoconductor from which the above-mentioned conventional shortcomings are eliminated, with high photosensitivity and uniform spectral absorbance not only in the entire visible region, but also in the semiconductor laser wavelength region, and which gives rise to no difficulty in producing of the electrophotographic photoconductor and is suitable for use in laser printers.

The above object of the present invention is acheived by an electrophotographic photoconductor comprising an electroconductive support and a photoconductive layer comprising as a charge generating material an azo pigment of the following general formula (I):

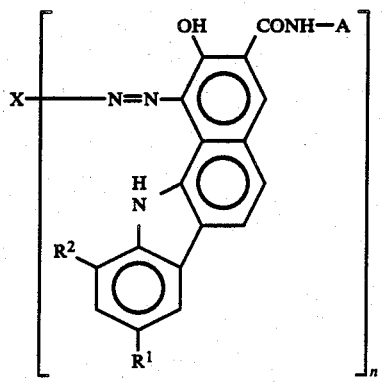

$R^1$ represents H, Cl, $CH_3$, or $OCH_3$, $R^2$ represents H, Cl, or $CH_3$, provided that $R^1$ and $R^2$ may not be the same;

A represents

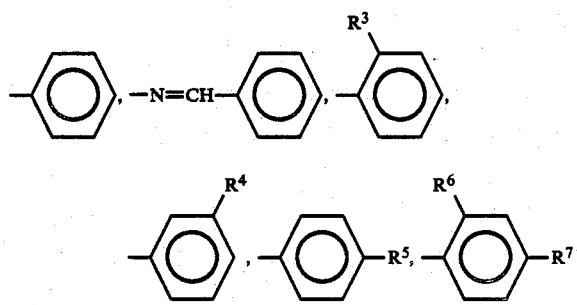

where $R^3$ represents a lower alkyl group or a nitro group, $R^4$ represents a lower alkyl group, a lower alkoxyl group, Cl, $R^5$ represents a lower alkyl group, a lower alkoxyl group, Cl, a nitro group, and $R^6$ and $R^7$ each represent a lower alkyl group or Cl, and X represents

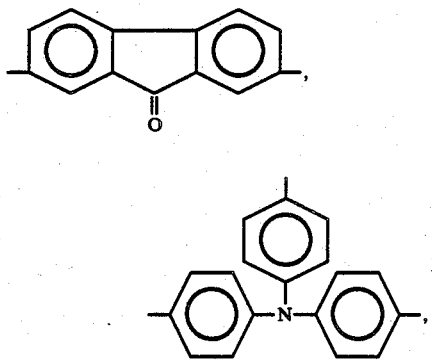

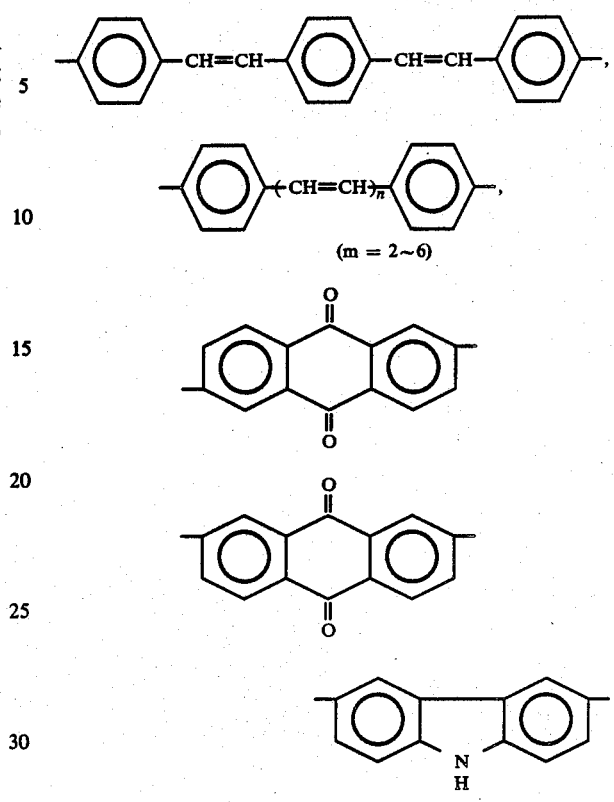

n is an integer of 2 or 3.

Figure 1:
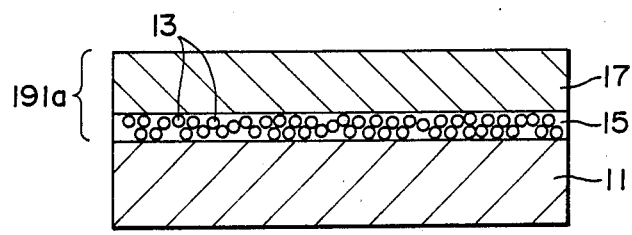
FIG. 1 is a schematic cross-sectional view of an embodiment of an electrophotographic photoconductor according to the present invention.

DETAILED DESCRIPTION OF THE PREFERRED EMBODIMENTS 2-hydroxy-3-carbamoylbenzo [a]carbazole derivatives which are employed as the starting materials for the preparation of the azo pigments employed as charge generating materials in the present invention can be prepared without difficulty, in the same manner as in the preparation of Naphtol AS and Naphtol AS-SR, for instance, in accordance with a method as described at pages 645 to 647 of "Dyestuff Chemistry" by Yutaka Hosoda (published by Gilhodo Co., Ltd. on Nov. 30, 1957).

Specifically, an aqueous solution of sodium sulfite and and an aqueous solution of sodium hydrgensulfite are added to 3,5-dihydroxy-3-napthoic acid. The mixture is then made acidic by addition of an inorganic acid. To this mixture, a phenyl hydrazine derivative of genereal formula (II) is added to form a 2-hydroxybenzo [a]carbozole-3-carboxylic acid derivative of general formula (III), which is then reacted with a halogeneration agent to prepare a 2-hydroxybenzo [a]carbazole-3-carboxylic acid derivative of general formula (IV):

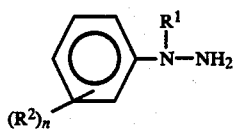
(II)

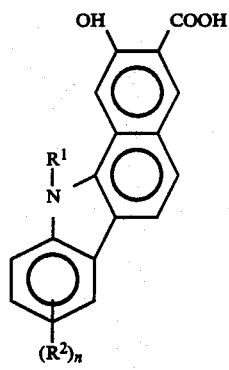
(III)

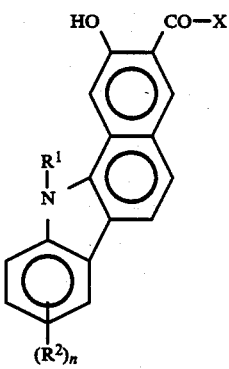
(IV)

wherein X represents halogen.

The 2-hydroxybenzo [a]carbozole-3-carboxylic acid derivative of general formula (IV) is reacted with an amine of general formula (V), whereby a 2-hydroxy-3-carbamoylbenzo [a]carbazole derivative of the following general formula (VI) is prepared:

(V)

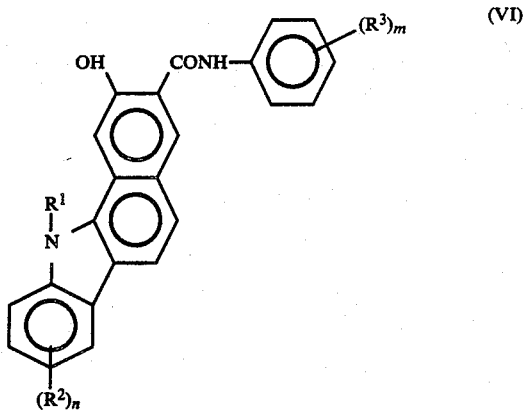
(VI)

The azo pigment for use in the present invention can be obtained by the coupling reaction of the 2-hydroxy-3-carbamoylbenzo [a]carbazole derivative of general formula (VI) with any of the following diazonium salts:

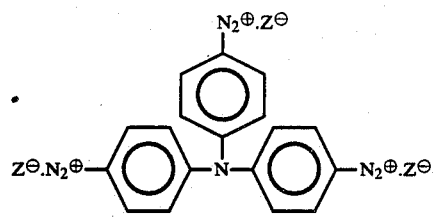

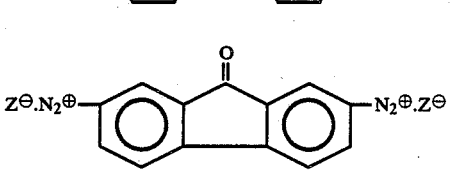

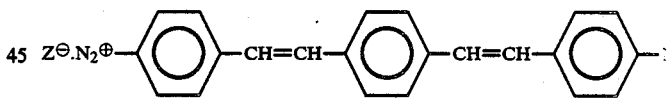

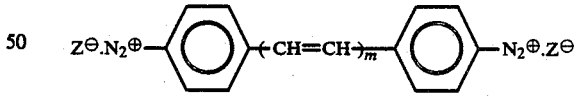

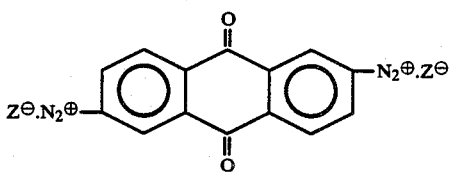

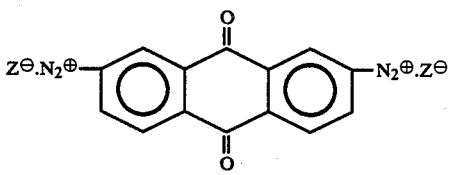

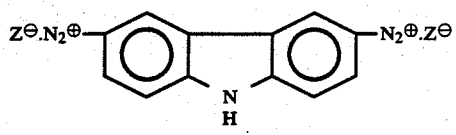

wherein $Z^\ominus$ represents an anionic functional group

The above coupling reaction is carried out by dissolving any of the above diazonium salts and a coupler in an organic solvent such as N,N-dimethylformamide (DMF) and dimethylsulfoxide (DMSO), and adding dropwise to this solution an alkaline aqueous solution such as an aqueous solution of sodium acetate at the temperatures ranging from about $-10°$ C to about $40°$ C. This reaction is accomplished in about 5 minutes to about 3 hours. After the completion of the reaction, crystals separated in the reaction mixture are filtered off and purified, for instance, by washing with water and/or organic solvents, or by recrystallization, whereby the azo pigments for use in the present invention can be obtained.

Specific examples of the azo pigments for use in the present invention are as follows. The azo pigments for use in the present invention are not limited thereto.

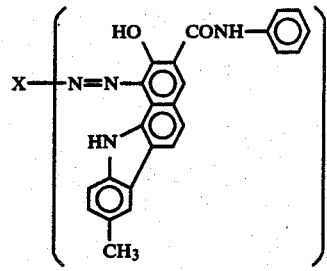

| Compound No. | X | n |
|---|---|---|
| 1 | 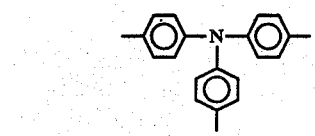 | 3 |
| 2 | 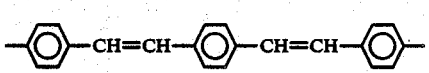 | 2 |
| 3 |  | 2 |
| 4 | 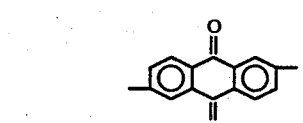 | 2 |
| 5 | 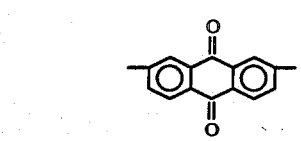 | 2 |
| 6 | 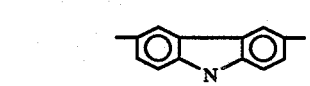 | 2 |

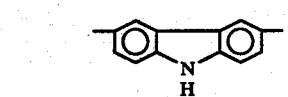

| Compound No. | X | n |
|---|---|---|
| 7 | (triphenylamine with CH₃) | 3 |
| 8 | (bis-stilbene) | 2 |
| 9 | (fluorenone) | 2 |
| 10 | (anthraquinone) | 2 |
| 11 | (anthraquinone) | 2 |
| 12 | (carbazole NH) | 2 |

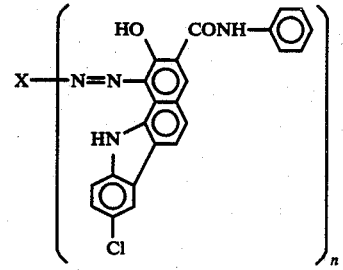

| Compound No. | X | n |
|---|---|---|

-continued
| No. | structure | n |
|---|---|---|
| 13 | 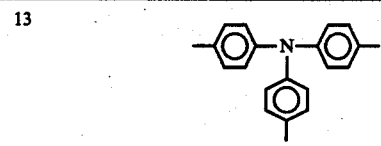 | 3 |
| 14 | 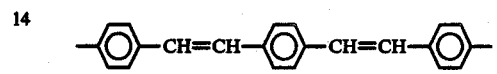 | 2 |
| 15 | 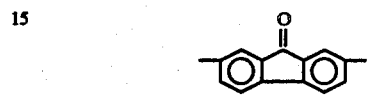 | 2 |
| 16 | 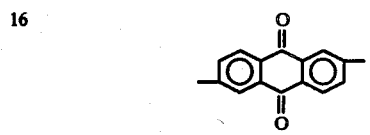 | 2 |
| 17 |  | 2 |
| 18 |  | 2 |
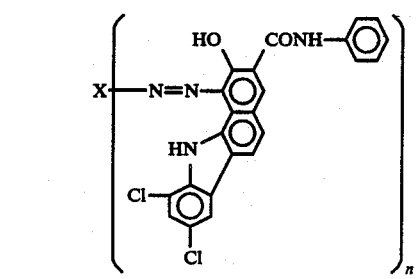
| Compound No. | X | n |
|---|---|---|
| 19 | 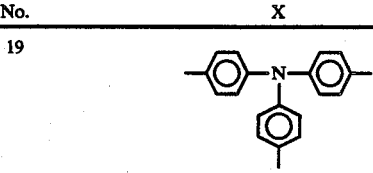 | 3 |
| 20 | 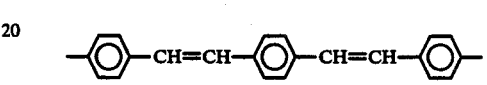 | 2 |
| 21 | 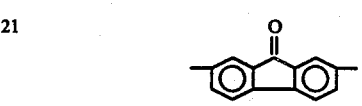 | 2 |
| 22 | 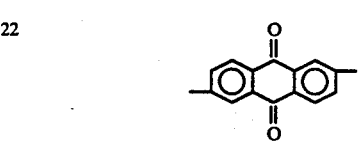 | 2 |
-continued
| No. | structure | n |
|---|---|---|
| 23 | 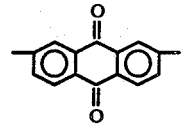 | 2 |
| 24 | 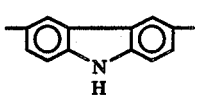 | 2 |
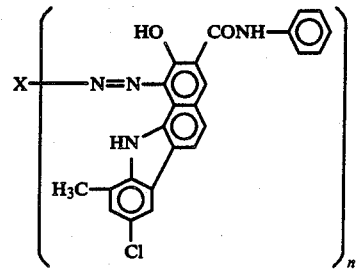
| Compound No. | X | n |
|---|---|---|
| 25 | 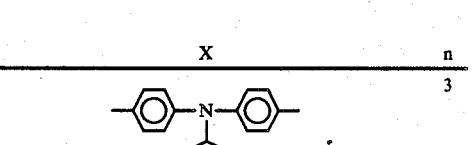 | 3 |
| 26 | 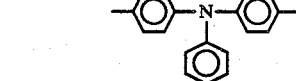 | 2 |
| 27 | 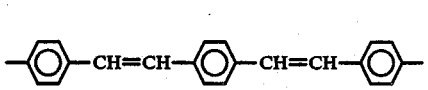 | 2 |
| 28 |  | 2 |
| 29 | 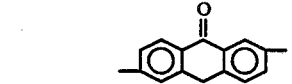 | 2 |
| 30 |  | 2 |
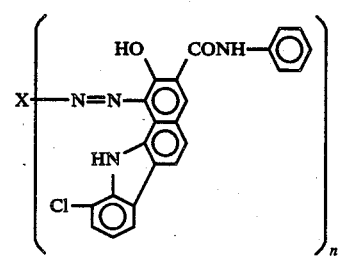
| Compound No. | X | n |
|---|---|---|

11
-continued
| | | |
|---|---|---|
| 31 | 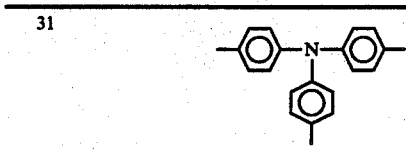 | 3 |
| 32 |  | 2 |
| 33 | | 2 |
12
-continued
| | | |
|---|---|---|
| 34 | 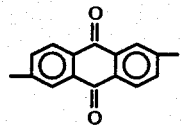 | 2 |
| 35 | 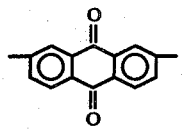 | 2 |
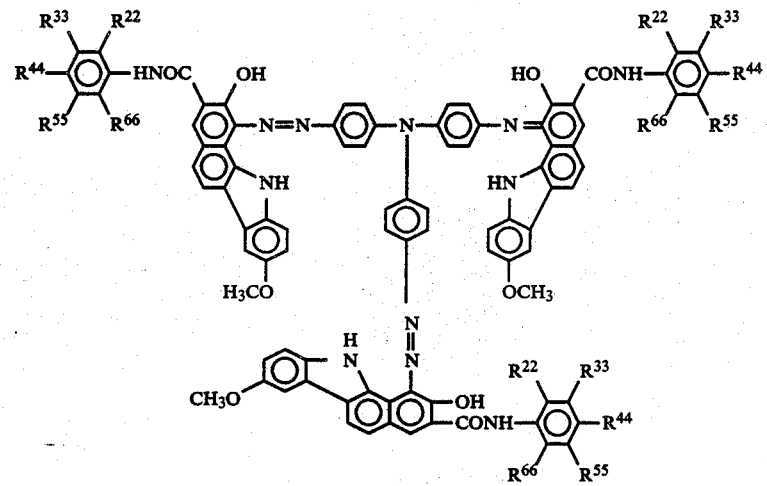
| Compound No. | R²² | R³³ | R⁴⁴ | R⁵⁵ | R⁶⁶ |
|---|---|---|---|---|---|
| 36 | NO₂ | H | H | H | H |
| 37 | H | H | NO₂ | H | H |
| 38 | H | Cl | H | H | H |
| 39 | H | H | Cl | H | H |
| 40 | CH₃ | H | H | H | H |
| 41 | H | CH₃ | H | H | H |
| 42 | H | H | CH₃ | H | H |
| 43 | C₂H₅ | H | H | H | H |
| 44 | H | C₂H₅ | H | H | H |
| 45 | H | H | C₂H₅ | H | H |
| 46 | H | OCH₃ | H | H | H |
| 47 | H | H | OCH₃ | H | H |
| 48 | H | OC₂H₅ | H | H | H |
| 49 | H | H | OC₂H₅ | H | H |
| 50 | CH₃ | H | CH₃ | H | H |
| 51 | CH₃ | H | Cl | H | H |
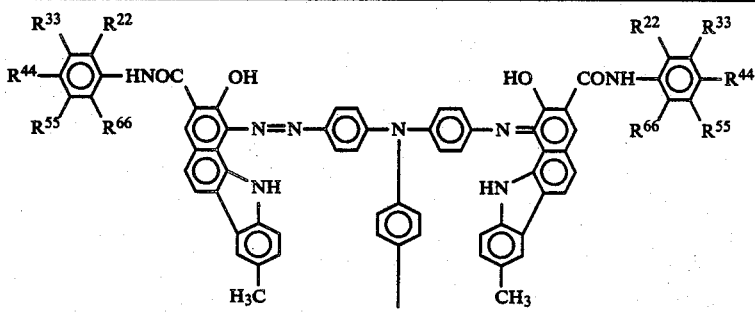

-continued
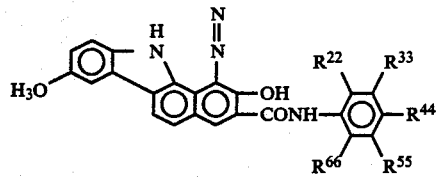
| Compound No. | R³³ | R⁴⁴ | R⁵⁵ | R⁶⁶ |
|---|---|---|---|---|
| 52 | NO₂ | H | H | H |
| 53 | H | H | NO₂ | H |
| 54 | H | Cl | H | H |
| 55 | H | H | Cl | H |
| 56 | CH₃ | H | H | H |
| 57 | H | CH₃ | H | H |
| 58 | H | H | CH₃ | H |
| 59 | C₂H₅ | H | H | H |
| 60 | H | C₂H₅ | H | H |
| 61 | H | H | C₂H₅ | H |
| 62 | H | OCH₃ | H | H |
| 63 | H | H | OCH₃ | H |
| 64 | H | OC₂H₅ | H | H |
| 65 | H | H | OC₂H₅ | H |
| 66 | CH₃ | H | CH₃ | H |
| 67 | CH₃ | H | Cl | H |
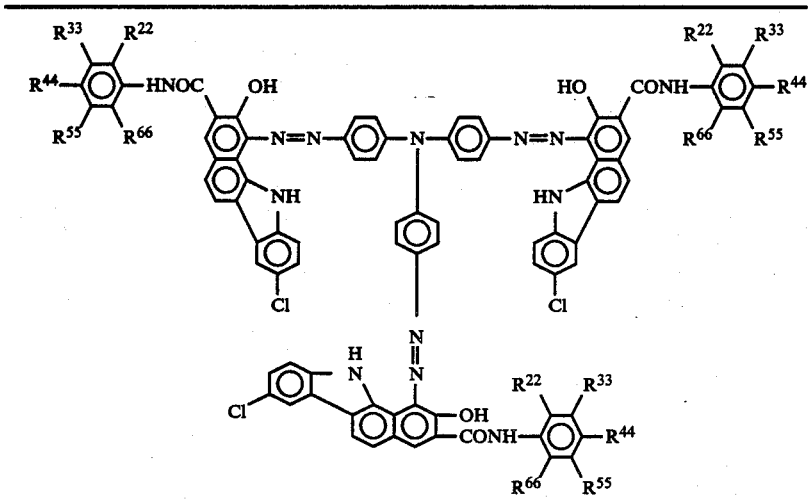
| Compound No. | R²² | R³³ | R⁴⁴ | R⁵⁵ | R⁶⁶ |
|---|---|---|---|---|---|
| 68 | NO₂ | H | H | H | H |
| 69 | H | H | NO₂ | H | H |
| 70 | H | Cl | H | H | H |
| 71 | H | H | Cl | H | H |
| 72 | CH₃ | H | H | H | H |
| 73 | H | CH₃ | H | H | H |
| 74 | H | H | CH₃ | H | H |
| 75 | C₂H₅ | H | H | H | H |
| 76 | H | C₂H₅ | H | H | H |
| 77 | H | H | C₂H₅ | H | H |
| 78 | H | OCH₃ | H | H | H |
| 79 | H | H | OCH₃ | H | H |
| 80 | H | OC₂H₅ | H | H | H |
| 81 | H | H | OC₂H₅ | H | H |
| 82 | CH₃ | H | CH₃ | H | H |
| 83 | CH₃ | H | Cl | H | H |

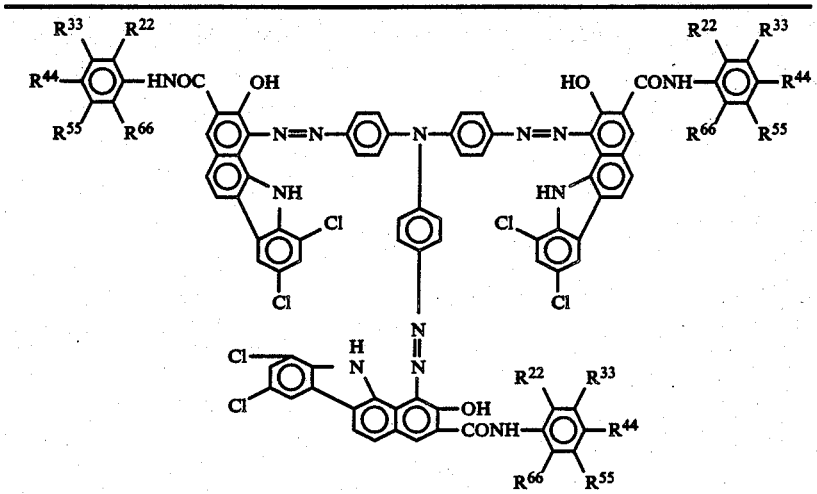
| Compound No. | R22 | R33 | R44 | R55 | R66 |
|---|---|---|---|---|---|
| 84 | NO2 | H | H | H | H |
| 85 | H | H | NO2 | H | H |
| 86 | H | Cl | H | H | H |
| 87 | H | H | Cl | H | H |
| 88 | CH3 | H | H | H | H |
| 89 | H | CH3 | H | H | H |
| 90 | H | H | CH3 | H | H |
| 91 | C2H5 | H | H | H | H |
| 92 | H | C2H5 | H | H | H |
| 93 | H | H | C2H5 | H | H |
| 94 | H | OCH3 | H | H | H |
| 95 | H | H | OCH3 | H | H |
| 96 | H | OC2H5 | H | H | H |
| 97 | H | H | OC2H5 | H | H |
| 98 | CH3 | H | CH3 | H | H |
| 99 | CH3 | H | Cl | H | H |
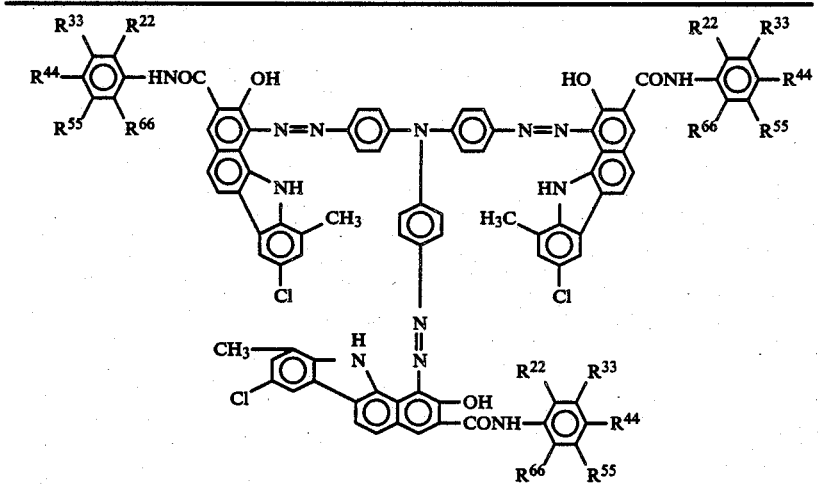
| Compound No. | R22 | R33 | R44 | R55 | R66 |
|---|---|---|---|---|---|
| 100 | NO2 | H | H | H | H |
| 101 | H | H | NO2 | H | H |
| 102 | H | Cl | H | H | H |
| 103 | H | H | Cl | H | H |
| 104 | CH3 | H | H | H | H |
| 105 | H | CH3 | H | H | H |
| 106 | H | H | CH3 | H | H |
| 107 | C2H5 | H | H | H | H |
| 108 | H | C2H5 | H | H | H |
| 109 | H | H | C2H5 | H | H |
| 110 | H | OCH3 | H | H | H |
| 111 | H | H | OCH3 | H | H |

-continued
| | | | | | |
|---|---|---|---|---|---|
| 112 | H | OC2H5 | H | H | H |
| 113 | H | OC2H5 | OC2H5 | H | H |
| 114 | CH3 | H | CH3 | H | H |
| 115 | CH3 | H | Cl | H | H |
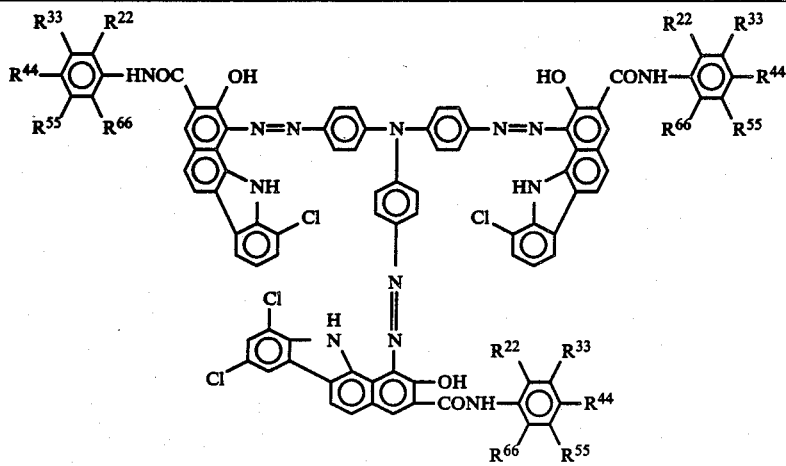
| Compound No. | $R^{22}$ | $R^{33}$ | $R^{44}$ | $R^{55}$ | $R^{66}$ |
|---|---|---|---|---|---|
| 116 | NO2 | H | H | H | H |
| 117 | H | H | NO2 | H | H |
| 118 | H | Cl | H | H | H |
| 119 | H | H | Cl | H | H |
| 120 | CH3 | H | H | H | H |
| 121 | H | CH3 | H | H | H |
| 122 | H | H | CH3 | H | H |
| 123 | C2H5 | H | H | H | H |
| 124 | H | C2H5 | H | H | H |
| 125 | H | H | C2H5 | H | H |
| 126 | H | OCH3 | H | H | H |
| 127 | H | H | OCH3 | H | H |
| 128 | H | OC2H5 | H | H | H |
| 129 | H | H | OC2H5 | H | H |
| 130 | CH3 | H | CH3 | H | H |
| 131 | CH3 | H | Cl | H | H |
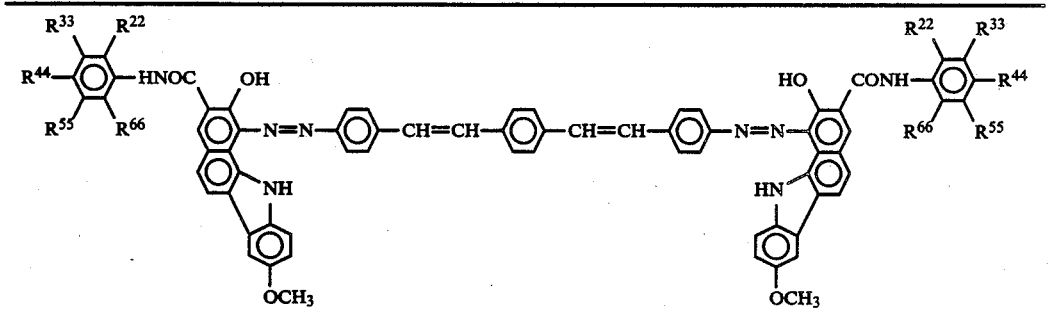
| Compound No. | $R^{22}$ | $R^{33}$ | $R^{44}$ | $R^{55}$ | $R^{66}$ |
|---|---|---|---|---|---|
| 132 | NO2 | H | H | H | H |
| 133 | H | H | NO2 | H | H |
| 134 | H | Cl | H | H | H |
| 135 | H | H | Cl | H | H |
| 136 | CH3 | H | H | H | H |
| 137 | H | CH3 | H | H | H |
| 138 | H | H | CH3 | H | H |
| 139 | C2H5 | H | H | H | H |
| 140 | H | C2H5 | H | H | H |
| 141 | H | H | C2H5 | H | H |
| 142 | H | OCH3 | H | H | H |
| 143 | H | H | OCH3 | H | H |
| 144 | H | OC2H5 | H | H | H |

-continued

| | | | | | |
|---|---|---|---|---|---|
| 145 | H | H | OC$_2$H$_5$ | H | H |
| 146 | CH$_3$ | H | CH$_3$ | H | H |
| 147 | CH$_3$ | H | Cl | H | H |

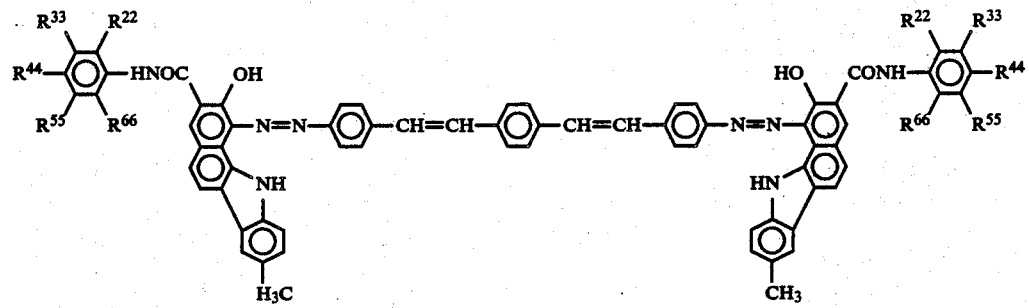

| Compound No. | R$^{22}$ | R$^{33}$ | R$^{44}$ | R$^{55}$ | R$^{66}$ |
|---|---|---|---|---|---|
| 148 | NO$_2$ | H | H | H | H |
| 149 | H | H | NO$_2$ | H | H |
| 150 | H | Cl | H | H | H |
| 151 | H | H | Cl | H | H |
| 152 | CH$_3$ | H | H | H | H |
| 153 | H | CH$_3$ | H | H | H |
| 154 | H | H | CH$_3$ | H | H |
| 155 | C$_2$H$_5$ | H | H | H | H |
| 156 | H | C$_2$H$_5$ | H | H | H |
| 157 | H | H | C$_2$H$_5$ | H | H |
| 158 | H | OCH$_3$ | H | H | H |
| 159 | H | H | OCH$_3$ | H | H |
| 160 | H | OC$_2$H$_5$ | H | H | H |
| 161 | H | H | OC$_2$H$_5$ | H | H |
| 162 | CH$_3$ | H | CH$_3$ | H | H |
| 163 | CH$_3$ | H | Cl | H | H |

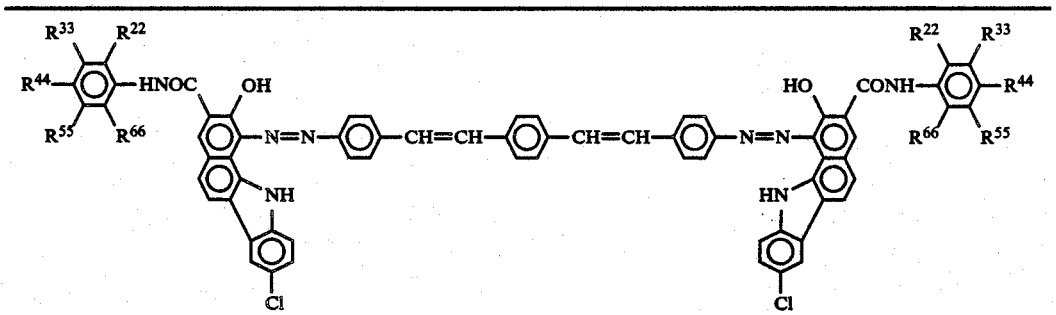

| Compound No. | R$^{22}$ | R$^{33}$ | R$^{44}$ | R$^{55}$ | R$^{66}$ |
|---|---|---|---|---|---|
| 164 | NO$_2$ | H | H | H | H |
| 165 | H | H | NO$_2$ | H | H |
| 166 | H | Cl | H | H | H |
| 167 | H | H | Cl | H | H |
| 168 | CH$_3$ | H | H | H | H |
| 169 | H | CH$_3$ | H | H | H |
| 170 | H | H | CH$_3$ | H | H |
| 171 | C$_2$H$_5$ | H | H | H | H |
| 172 | H | C$_2$H$_5$ | H | H | H |
| 173 | H | H | C$_2$H$_5$ | H | H |
| 174 | H | OCH$_3$ | H | H | H |
| 175 | H | H | OCH$_3$ | H | H |
| 176 | H | OC$_2$H$_5$ | H | H | H |
| 177 | CH$_3$ | H | CH$_3$ | H | H |
| 178 | CH$_3$ | H | Cl | H | H |

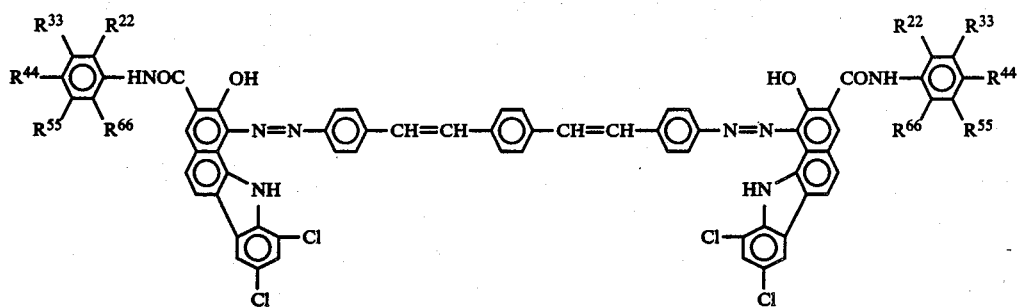
| Compound No. | R²² | R³³ | R⁴⁴ | R⁵⁵ | R⁶⁶ |
|---|---|---|---|---|---|
| 179 | NO₂ | H | H | H | H |
| 180 | H | H | NO₂ | H | H |
| 181 | H | Cl | H | H | H |
| 182 | H | H | Cl | H | H |
| 183 | CH₃ | H | H | H | H |
| 184 | H | CH₃ | H | H | H |
| 185 | H | H | CH₃ | H | H |
| 186 | C₂H₅ | H | H | H | H |
| 187 | H | C₂H₅ | H | H | H |
| 188 | H | H | C₂H₅ | H | H |
| 189 | H | OCH₃ | H | H | H |
| 190 | H | H | OCH₃ | H | H |
| 191 | H | OC₂H₅ | H | H | H |
| 192 | H | H | OC₂H₅ | H | H |
| 193 | CH₃ | H | CH₃ | H | H |
| 194 | CH₃ | H | Cl | H | H |
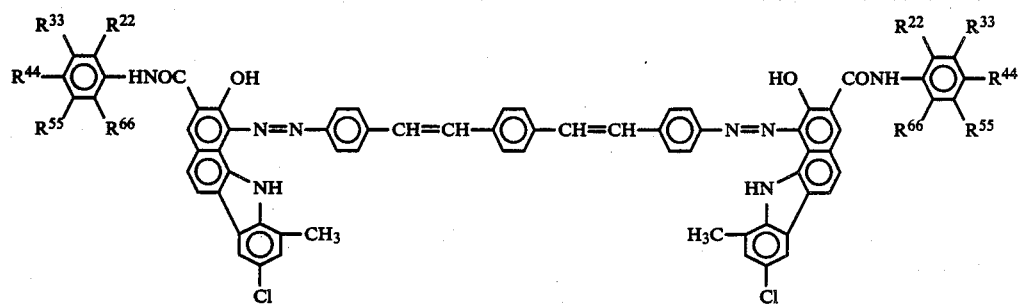
| Compound No. | R²² | R³³ | R⁴⁴ | R⁵⁵ | R⁶⁶ |
|---|---|---|---|---|---|
| 195 | NO₂ | H | H | H | H |
| 196 | H | H | NO₂ | H | H |
| 197 | H | Cl | H | H | H |
| 198 | H | H | Cl | H | H |
| 199 | CH₃ | H | H | H | H |
| 200 | H | CH₃ | H | H | H |
| 201 | H | H | CH₃ | H | H |
| 202 | C₂H₅ | H | H | H | H |
| 203 | H | C₂H₅ | H | H | H |
| 204 | H | H | C₂H₅ | H | H |
| 205 | H | OCH₃ | H | H | H |
| 206 | H | H | OCH₃ | H | H |
| 207 | H | OC₂H₅ | H | H | H |
| 208 | H | H | OC₂H₅ | H | H |
| 209 | CH₃ | H | CH₃ | H | H |
| 210 | CH₃ | H | Cl | H | H |

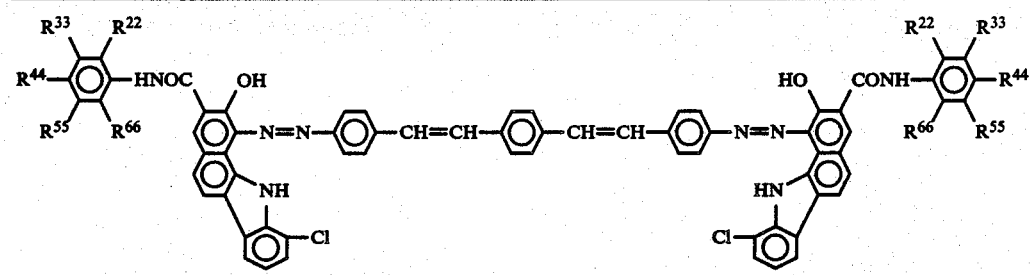

| Compound No. | $R^{22}$ | $R^{33}$ | $R^{44}$ | $R^{55}$ | $R^{66}$ |
|---|---|---|---|---|---|
| 211 | $NO_2$ | H | H | H | H |
| 212 | H | H | $NO_2$ | H | H |
| 213 | H | Cl | H | H | H |
| 214 | H | H | Cl | H | H |
| 215 | $CH_3$ | H | H | H | H |
| 216 | H | $CH_3$ | H | H | H |
| 217 | H | H | $CH_3$ | H | H |
| 218 | $C_2H_5$ | H | H | H | H |
| 219 | H | $C_2H_5$ | H | H | H |
| 220 | H | H | $C_2H_5$ | H | H |
| 221 | H | $OCH_3$ | H | H | H |
| 222 | H | H | $OCH_3$ | H | H |
| 223 | H | $OC_2H_5$ | H | H | H |
| 224 | H | H | $OC_2H_5$ | H | H |
| 225 | $CH_3$ | H | $CH_3$ | H | H |
| 226 | $CH_3$ | H | Cl | H | H |

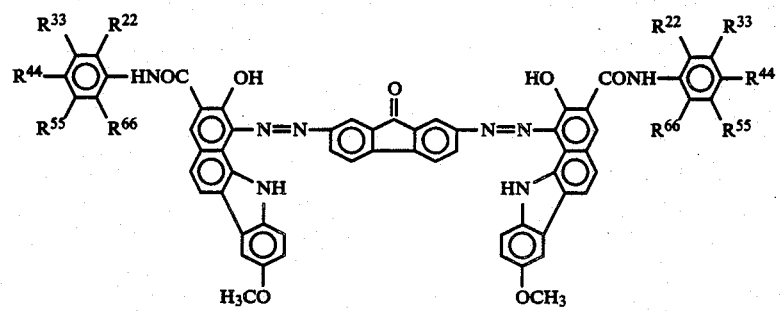

| Compound No. | $R^{22}$ | $R^{33}$ | $R^{44}$ | $R^{55}$ | $R^{66}$ |
|---|---|---|---|---|---|
| 227 | $NO_2$ | H | H | H | H |
| 228 | H | H | $NO_2$ | H | H |
| 229 | H | Cl | H | H | H |
| 230 | H | H | Cl | H | H |
| 231 | $CH_3$ | H | H | H | H |
| 232 | H | $CH_3$ | H | H | H |
| 233 | H | H | $CH_3$ | H | H |
| 234 | $C_2H_5$ | H | H | H | H |
| 235 | H | $C_2H_5$ | H | H | H |
| 236 | H | H | $C_2H_5$ | H | H |
| 237 | H | $OCH_3$ | H | H | H |
| 238 | H | H | $OCH_3$ | H | H |
| 239 | H | $OC_2H_5$ | H | H | H |
| 240 | H | H | $OC_2H_5$ | H | H |
| 241 | $CH_3$ | H | $CH_3$ | H | H |
| 242 | $CH_3$ | H | Cl | H | H |

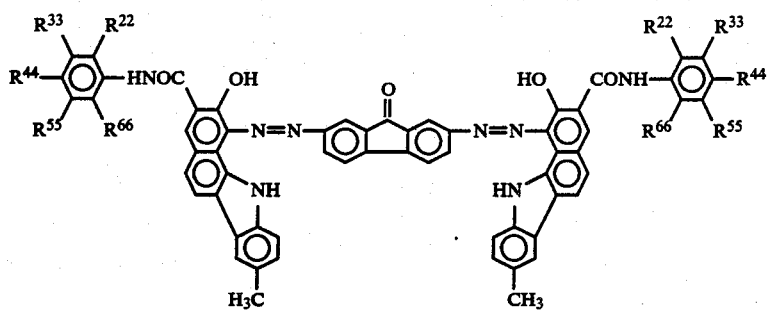
| Compound No. | R²² | R³³ | R⁴⁴ | R⁵⁵ | R⁶⁶ |
|---|---|---|---|---|---|
| 243 | NO₂ | H | H | H | H |
| 244 | H | H | NO₂ | H | H |
| 245 | H | Cl | H | H | H |
| 246 | H | H | Cl | H | H |
| 247 | CH₃ | H | H | H | H |
| 248 | H | Ch₃ | H | H | H |
| 249 | H | H | CH₃ | H | H |
| 250 | C₂H₅ | H | H | H | H |
| 251 | H | C₂H₅ | H | H | H |
| 252 | H | H | C₂H₅ | H | H |
| 253 | H | OCH₃ | H | H | H |
| 254 | H | H | OCH₃ | H | H |
| 255 | H | OC₂H₅ | H | H | H |
| 256 | H | H | OC₂H₅ | H | H |
| 257 | CH₃ | H | CH₃ | H | H |
| 258 | CH₃ | H | Cl | H | H |
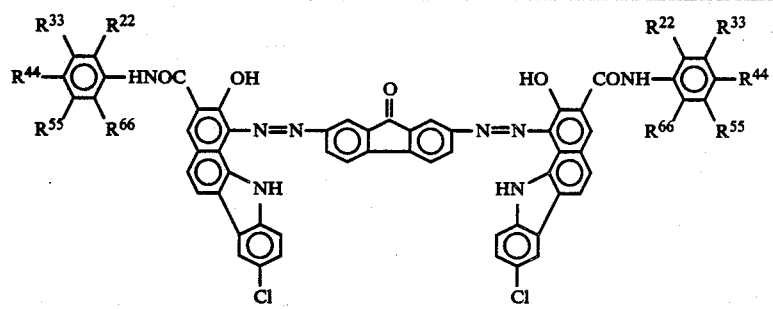
| Compound No. | R²² | R³³ | R⁴⁴ | R⁵⁵ | R⁶⁶ |
|---|---|---|---|---|---|
| 259 | NO₂ | H | H | H | H |
| 260 | H | H | NO₂ | H | H |
| 261 | H | Cl | H | H | H |
| 262 | H | H | Cl | H | H |
| 263 | CH₃ | H | H | H | H |
| 264 | H | CH₃ | H | H | H |
| 265 | H | H | CH₃ | H | H |
| 266 | C₂H₅ | H | H | H | H |
| 267 | H | C₂H₅ | H | H | H |
| 268 | H | H | C₂H₅ | H | H |
| 269 | H | OCH₃ | H | H | H |
| 270 | H | H | OCH₃ | H | H |
| 271 | H | OC₂H₅ | H | H | H |
| 272 | H | H | OC₂H₅ | H | H |
| 273 | CH₃ | H | CH₃ | H | H |
| 274 | CH₃ | H | Cl | H | H |

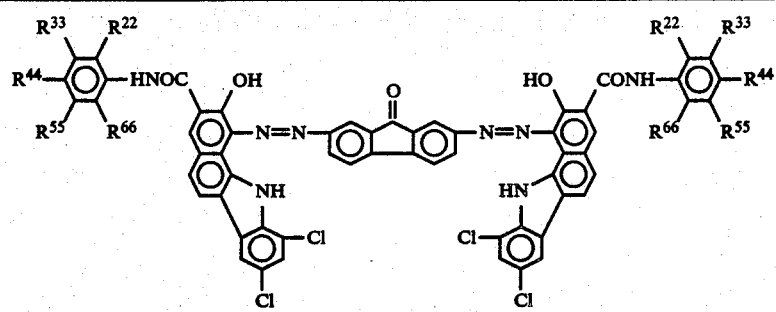

| Compound No. | $R^{22}$ | $R^{33}$ | $R^{44}$ | $R^{55}$ | $R^{66}$ |
|---|---|---|---|---|---|
| 275 | $NO_2$ | H | H | H | H |
| 276 | H | H | $NO_2$ | H | H |
| 277 | H | Cl | H | H | H |
| 278 | H | H | Cl | H | H |
| 279 | $CH_3$ | H | H | H | H |
| 280 | H | $CH_3$ | H | H | H |
| 281 | H | H | $CH_3$ | H | H |
| 282 | $C_2H_5$ | H | H | H | H |
| 283 | H | $C_2H_5$ | H | H | H |
| 284 | H | H | $C_2H_5$ | H | H |
| 285 | H | $OCH_3$ | H | H | H |
| 286 | H | H | $OCH_3$ | H | H |
| 287 | H | $OC_2H_5$ | H | H | H |
| 288 | H | H | $OC_2H_5$ | H | H |
| 289 | $CH_3$ | H | $CH_3$ | H | H |
| 290 | $CH_3$ | H | Cl | H | H |

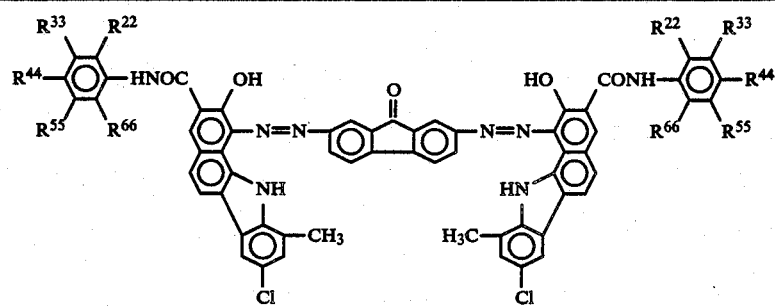

| Compound No. | $R^{22}$ | $R^{33}$ | $R^{44}$ | $R^{55}$ | $R^{66}$ |
|---|---|---|---|---|---|
| 291 | $NO_2$ | H | H | H | H |
| 292 | H | H | $NO_2$ | H | H |
| 293 | H | Cl | H | H | H |
| 294 | H | H | Cl | H | H |
| 295 | $CH_3$ | H | H | H | H |
| 296 | H | $CH_3$ | H | H | H |
| 297 | H | H | $CH_3$ | H | H |
| 298 | $C_2H_5$ | H | H | H | H |
| 299 | H | $C_2H_5$ | H | H | H |
| 300 | H | H | $C_2H_5$ | H | H |
| 301 | H | $OCH_3$ | H | H | H |
| 302 | H | H | $OCH_3$ | H | H |
| 303 | H | $OC_2H_5$ | H | H | H |
| 304 | H | H | $OC_2H_5$ | H | H |
| 305 | $CH_3$ | H | $CH_3$ | H | H |
| 306 | $CH_3$ | H | Cl | H | H |

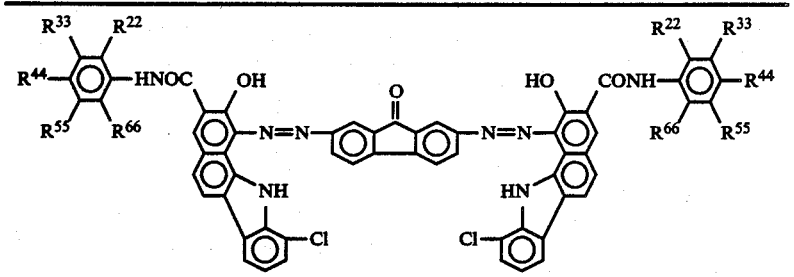

| Compound No. | R²² | R³³ | R⁴⁴ | R⁵⁵ | R⁶⁶ |
|---|---|---|---|---|---|
| 307 | NO₂ | H | H | H | H |
| 308 | H | H | NO₂ | H | H |
| 309 | H | H | Cl | H | H |
| 310 | H | H | Cl | H | H |
| 311 | CH₃ | H | H | H | H |
| 312 | H | CH₃ | H | H | H |
| 313 | H | H | CH₃ | H | H |
| 314 | C₂H₅ | H | H | H | H |
| 315 | H | C₂H₅ | H | H | H |
| 316 | H | H | C₂H₅ | H | H |
| 317 | H | OCH₃ | H | H | H |
| 318 | H | H | OCH₃ | H | H |
| 319 | H | OC₂H₅ | H | H | H |
| 320 | H | H | OC₂H₅ | H | H |
| 321 | CH₃ | H | CH₃ | H | H |
| 322 | CH₃ | H | Cl | H | H |

In addition to the above azo pigments, the following bisazo pigments having the following general formula can be employed in the present invention:

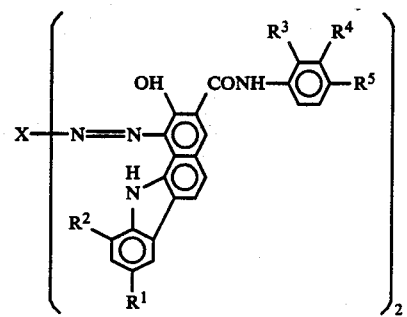

In the above general formula, X can be selected from the following:

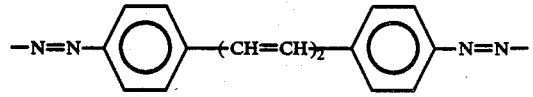 I

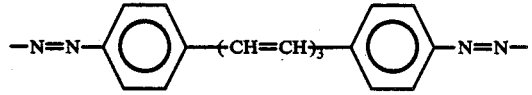 II

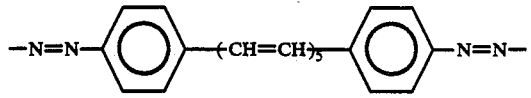 III

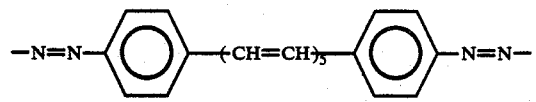 IV

-continued

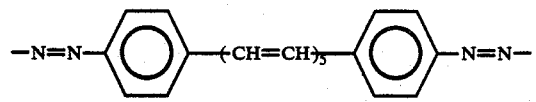 V

In the above general formula, for each coupler residual radical, there are five different central skeletons represented by X. For example, a bisazo pigment consisting of the central skeleton of II and a coupler residual radical of C-39 is represented by II-C-39 in the following table.

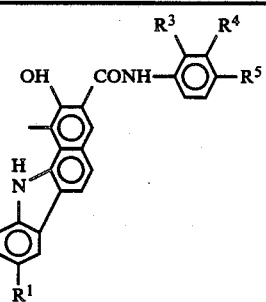

| Coupler Residual Radical No. | R¹ | R² | R³ | R⁴ | R⁵ |
|---|---|---|---|---|---|
| C-1 | OCH₃ | H | H | H | H |
| C-2 | CH₃ | H | H | H | H |
| C-3 | Cl | H | H | H | H |
| C-4 | Cl | Cl | H | H | H |
| C-5 | Cl | CH₃ | H | H | H |
| C-6 | OCH₃ | H | H | OCH₃ | H |
| C-7 | OCH₃ | H | H | H | OCH₃ |
| C-8 | OCH₃ | H | CH₃ | H | H |
| C-9 | OCH₃ | H | H | CH₃ | H |
| C-10 | OCH₃ | H | H | H | CH₃ |
| C-11 | OCH₃ | H | H | Cl | H |

-continued

|      | 1    | 2   | 3    | 4    | 5    |
|------|------|-----|------|------|------|
| C-12 | OCH3 | H   | H    | H    | Cl   |
| C-13 | OCH3 | H   | NO2  | H    | H    |
| C-14 | OCH3 | H   | H    | H    | NO2  |
| C-15 | OCH3 | H   | C2H5 | H3   | H    |
| C-16 | OCH3 | H   | H    | C2H5 | H    |
| C-17 | OCH3 | H   | H    | H    | C2H5 |
| C-18 | OCH3 | H   | H    | H    | OC2H5 |
| C-19 | OCH3 | H   | CH3  | H    | CH3  |
| C-20 | OCH3 | H   | CH3  | H    | CH3  |
| C-21 | OCH3 | H   | Cl   | H    | Cl   |
| C-22 | CH3  | H   | H    | H    | OCH3 |
| C-23 | CH3  | H   | H    | OCH3 | H    |
| C-24 | CH3  | H   | H    | CH3  | H    |
| C-25 | CH3  | H   | CH3  | H    | H    |
| C-26 | CH3  | H   | H    | H    | CH3  |
| C-27 | CH3  | H   | H    | Cl   | H    |
| C-28 | CH3  | H   | H    | H    | Cl   |
| C-29 | CH3  | H   | NO2  | H    | H    |
| C-30 | CH3  | H   | H    | H    | NO2  |
| C-31 | CH3  | H   | C2H5 | H    | H    |
| C-32 | CH3  | H   | H    | C2H5 | H    |
| C-33 | CH3  | H   | H    | H    | C2H5 |
| C-34 | CH3  | H   | H    | H    | OC2H5 |
| C-35 | CH3  | H   | Cl   | H    | Cl   |
| C-36 | Cl   | H   | H    | OCH3 | H    |
| C-37 | Cl   | H   | H    | H    | OCH3 |
| C-38 | Cl   | H   | CH3  | H    | H    |
| C-39 | Cl   | H   | H    | CH3  | H    |
| C-40 | Cl   | H   | H    | H    | CH3  |
| C-41 | Cl   | H   | H    | Cl   | H    |
| C-42 | Cl   | H   | H    | H    | Cl   |
| C-43 | Cl   | H   | NO2  | H    | H    |
| C-44 | Cl   | H   | H    | H    | NO2  |
| C-45 | Cl   | H   | C2H5 | H    | H    |
| C-46 | Cl   | H   | H    | C2H5 | H    |
| C-47 | Cl   | H   | H    | H    | C2H5 |
| C-48 | Cl   | H   | H    | H    | OC2H5 |
| C-49 | Cl   | H   | CH3  | H    | CH3  |
| C-50 | Cl   | H   | CH3  | H    | Cl   |
| C-51 | Cl   | H   | Cl   | H    | Cl   |
| C-52 | Cl   | Cl  | H    | H    | CH3  |
| C-53 | Cl   | Cl  | H    | H    | NO2  |
| C-54 | Cl   | Cl  | H    | H    | OCH3 |
| C-55 | Cl   | Cl  | H    | H    | Cl   |
| C-56 | Cl   | CH3 | H    | Cl   | H    |
| C-57 | OCH3 | Cl  | H    | H    | H    |
| C-58 | CH3  | CH3 | H    | H    | H    |
| C-59 | CH3  | Cl  | H    | H    | H    |

C-60

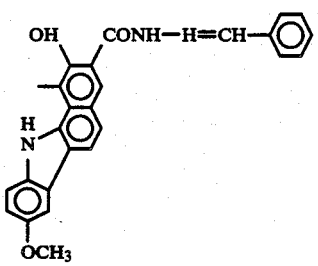

Preparation of two azo pigments (Compound No. 72 and Bisazo Pigment II-C-39) for use in the present invention will now be explained specifically for the purpose of illustration.

PREPARATION EXAMPLE 1 (COMPOUND NO. 72)

0.47 g of triphenylamine-4,4',4"-tris(diazonium)tris(tetrafluoroborate) and 0.96 g of 2-hydroxy-3-(2-methylphenyl)carbamoyl-8-chlorobenzo[a]carbazole were dissolved in 75 ml of cooled N,N-dimethylformamide(DMF). To this solution, 3.8 ml of a 10.5% sodium acetate aqueous solution was added dropwise over a period of about 5 minutes with the reaction mixture cooled to 5° to 10° C. After the dropwise addition of the sodium acetate aqueous solution, the cooling of the reaction mixture was stopped and the reaction mixture was stirred at room temperature for about 2 hours. A precipitate was formed. The precipitate was filtered off, washed with 100 ml of DMF heated to 80° C., and then with 100 ml of water two times, and dried under reduced pressure of 2 mmHg at 80° C., whereby 0.88 g of a trisazo pigment (Compound No. 72) was obtained in a 72% yield. The thus obtained trisazo pigment was a black powder.

An infrared spectrum of the trisazo pigment, taken by use of a KBr tablet, indicated $\nu_{NH}$ (carbazole) near 3440 cm$^{-1}$ and $\nu_{CO}$ (secondary amide) near 1670 cm$^{-1}$.

The melting point of the triszao pigment was more than 300° C.

An elemental analysis of the trisazo pigment indicated as follows:

|            | % C   | % H  | % N   |
|------------|-------|------|-------|
| Found      | 70.59 | 3.69 | 11.69 |
| Calculated | 70.84 | 3.96 | 11.93 |

PREPARATION EXAMPLE 2 (BISAZO PIGMENT II-C-39)

0.30 g of 1,6-diphenyl-1,3,5-hexatriene-4',4"-bis(diazonium)bis(tetrafluoroborate) and 0.54 g of 2-hydroxy-3-(3-methylphenyl)carbamoyl-8-chloro-11H-benzo[a]carbazole were dissolved in 70 ml of N,N-dimethylformamide. To this solution, 2.6 ml of an 8.3% sodium acetate aqueous solution was added dropwise at room temperature. After the dropwise addition of the sodium acetate aqueous solution, the reaction mixture was stirred at the same temperature for about 3 hours. A pigment precipitated. The precipitated pigment was filtered off, washed with 200 ml of DMF seven times and then with 200 ml of water two times, and dried under reduce pressure with application of heat thereto, whereby 0.61 g of Bisazo Pigment II-C-39 was obtained in a 86% yield. The thus obtained bisazo pigment was a bluish black powder.

The decomposition point of the pigment indicated by the exothermic peak temperature in a thermal analysis thereof was 327° C.

An infrared spectrum of the bisazo pigment, taken by use of a KBr tablet, indicated an absorption at 3450 cm$^{-1}$ characteristic of NH stretching vibration, an absorption characteristic of the carbonyl of secondary amido at 1675 cm$^{-1}$ and an absorption characteristic of trans-olefine out-of-plane deformation vibration at 965 cm$^{-1}$.

An elemental analysis of the bisazo pigment indicated as follows:

|            | % C   | % H  | % N   |
|------------|-------|------|-------|
| Found      | 72.84 | 4.00 | 10.31 |
| Calculated | 72.98 | 4.28 | 10.32 |

The above calculation in the elemental analysis was based on the formula for the above bisazo pigment of $C_{66}H_{46}N_8O_4Cl_2$.

Electrophotographic photoconductors according to the present invention will now be explained, which contain any of the above-described azo pigments as charge generating materials in the photoconductive layers thereof.

Representative examples of the photoconductors according to the present invention are schematically shown in FIGS. 1 through 4.

FIG. 1 shows an electrophotographic photoconductor comprising, on an electroconductive support 11, a photoconductive layer 191a which comprises a charge generation layer 15 comprising as the main component an azo pigment 13 and a charge transport layer 17 comprising as the main component a charge transporting material.

In the electrophotographic photoconductor as shown in FIG. 1, the light for image formation passes through the charge transport layer 17 and reaches the charge generation layer 15, so that electric charges are generated by the azo pigment 13 in the charge generation layer 15. The charge transport layer 17 accepts the injection of the electric charges from the charge generation layer 15 and transports the same. Thus, the electric charges necessary for the light decay of the photoconductive layer 191 are generated by the azo pigment 13 and the transportation of the electric charges is performed by the charge transport layer 17.

Figure 2:
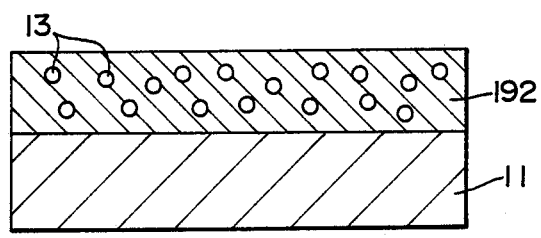
FIG. 2 is a schematic cross-sectional view of another embodiment of an electrophotographic photoconductor according to the present invention.

FIG. 2 shows an electrophotographic photoconductor comprising, on an electroconductive support 11, a photoconductive layer 192 which comprises as the main components an azo pigment 13, a charge transporting material, and an electrically insulating binder agent. In this photoconductor, the azo pigment 13 serves as charge generating material.

Figure 3:
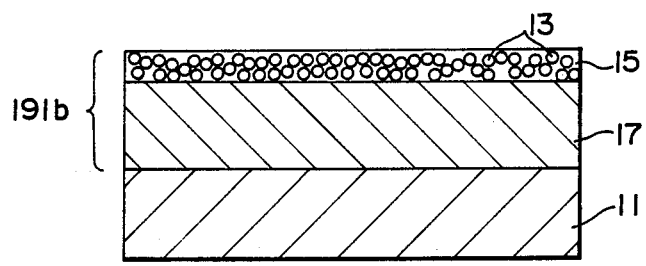
FIG. 3 is a schematic cross-sectional view of a further embodiment of an electrophotographic photoconductor according to the present invention.

FIG. 3 shows an electrophotographic photoconductor comprising, on an electroconductive support 11, a photoconductive layer 191b in which the charge generation layer 15 is formed on the charge transport layer 17 in contrast to the photoconductive layer 191a as shown in FIG. 1. The light decay mechanism in this electrophotographic photoconductor is the same as that in the photoconductor shown in FIG. 1.

Figure 4:
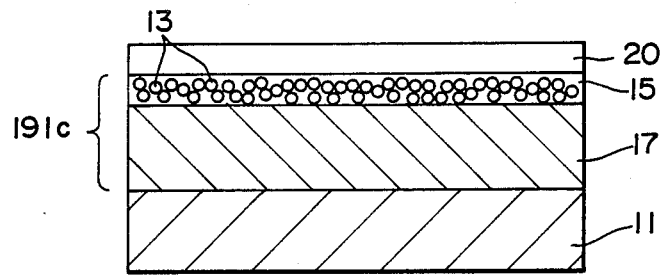
FIG. 4 is a schematic cross-sectional view of still another embodiment of an electrophotographich photoconductor according to the present invention.

FIG. 4 shows an electrophotographic photoconductor having the same structure as that of the photoconductor as shown in FIG. 3 except that a protective layer 20 is provided on the charge generation layer 15 of the photoconductive layer 191b. In this photoconductor, it is preferable that the resistivity of the protective layer 20 be slightly lower than that of the photoconductive layer 191b.

In any of the above electrophotographic photoconductors as shown in FIGS. 1 through 4, any intermediate layer may be interposed between the layers on the electroconductive support 11 and between the electroconductive support 11 and the layer formed thereon.

In any of the electrophotographic photoconductors shown in FIGS. 1, 3 and 4, it is preferable that the thickness of the charge generation layer 15 be in the range of 0.01 μm to 5 μm, more preferably in the range of 0.05 μm to 2 μm in view of the generation of electric charges and the charging potential to be obtained. Further it is preferable that the thickness of the charge transport layer 17 be in the range of 3 μm to 50 μm, more preferably in the range of 5 μm to 20 μm in view of the charge quantity to be obtained and the residual potential of the photoconductor.

The charge generation layer 15 comprises as the main component any of the azo pigments of the previously described general formula (I) and may further contain a binder agent and a plasticizer. It is preferable that the amount of the azo pigment contained in the charge generation layer 15 be 30 wt. % or more, more preferably 50 wt. % or more.

The charge transport layer 17 comprises as the main components a charge transporting material and a binder agent, with addition of a plasticizer thereto when necessary. It is preferable that the amount of the charge transporting material in the charge transport layer 17 be in the range of 10 wt. % to 95 wt. %, more preferably in the range of 30 wt. % to 90 wt. %, in view of the charge transporting performance of the charge transport layer 17 and the mechanical strength thereof.

In the case of the electrophotographic photoconductor as shown in FIG. 2, it is preferable that the thickness of the photoconductive layer 192 be in the range of 3 μm to 50 μm, more preferably in the range of 5 μm to 20 μm. Further it is preferable that the amount of the azo compound contained in the photoconductive layer 192 be 50 wt. % or less, more preferably 20 wt. % or less, and that the amount of the charge transporting material contained in the photoconductive layer 192 be in the range of 10 wt. % to 95 wt. %, more preferably in the range of 30 wt. % to 90 wt. %.

The key feature of the electrophotographic photoconductors according to the present invention is that the azo pigments including coupling components represented by the previously described general formula (I) are employed as charge generating materials. As other materials necessary for the electrophotographic photoconductors, such as electroconductive support and charge transporting material, conventionally employed materials can be employed.

As the electroconductive support for use in the photoconductors according to the present invention, a metal plate made of, for example, aluminum, copper or zinc; an electroconductive-material-deposited plastic sheet or film (made of, for instance, polyester), for example, an aluminum-deposited plastic film and a SnO₂-deposited plastic film; or paper treated so as to be electroconductive, can be employed.

As the binder agents for use in the present invention, the following resins can be employed: condensation resins, such as polyamide, polyurethane, polyester, epoxy resin, polyketone, polycarbonate; vinyl polymers, such as polyvinylketone, polystyrene, poly-N-vinylcarbazole, polyacrylamide, and other electrically insulating and adhesive resins.

As the plasticizers for use in the present invention, halogenated paraffin polibiphenyl chloride, dimethylnaphthalene and dibutyl phthalate can be employed. In addition, silicone oil can be employed for improvement of the surface of the photoconductor.

As the charge transporting materials, there are positive hole transporting materials and electron transporting materials.

Specific examples of positive hole transporting materials are the compounds represented by the following general formulas (1) through (11):

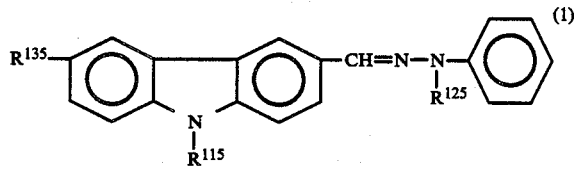

wherein $R^{115}$ represents a methyl group, an ethyl group, a 2-hydroxyethyl group, or a 2-chloroethyl group; $R^{125}$ represents a methyl group, an ethyl group, a benzyl group or a phenyl group; $R^{135}$ represents hydrogen, chlorine, bromine, an alkyl group having 1 to 4 carbon atoms, an alkoxyl group having 1 to 4 carbon atoms, a dialkylamino group or a nitro group.

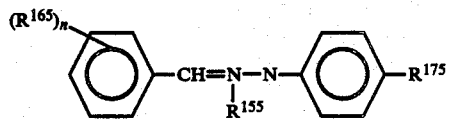
(2)

wherein Ar³ represents an unsubstituted or substituted naphthalne ring, an unsubstituted or substituted anthracene ring, an unsubstituted or substituted styryl group, a pyrydine ring, a furan ring, or a thiophene ring; and $R^{145}$ represents an alkyl group or a benzyl group.

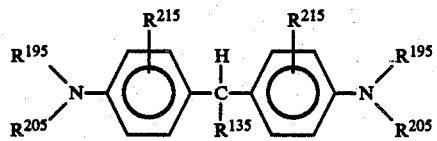
(3)

wherein $R^{155}$ represents an alkyl group, a benzyl group, a phenyl group, or a naphthyl group; $R^{165}$ represents hydrogen, an alkyl group having 1 to 3 carbon atoms, an alkoxyl group having 1 to 3 carbon atoms, a dialkylamino group, a diaralkylamino group or a diarylamino group; n is an integer of 1 to 4, and when n is 2 or more, $R^{165}$s may be the same or different; and $R^{175}$ represents hydrogen or a methoxy group.

(4)

wherein $R^{185}$ represents an alkyl group having 1 to 11 carbon atoms, an unsubstituted or substituted phenyl group, or a heterocyclic ring; $R^{195}$ and $R^{205}$ may be the same or different and each represent hydrogen, an alkyl group having 1 to 4 carbon atoms, a hydroxylalkyl group, a chloroalkyl group, or an unsubstituted or substituted aralkyl group, $R^{195}$ and $R^{205}$ may be bonded to each other to form a heterocyclic ring containing nitrogen atom(s); each $R^{215}$ may be the same or different and represents hydrogen, an alkyl group having 1 to 4 carbon atoms, an alkoxyl group or halogen.

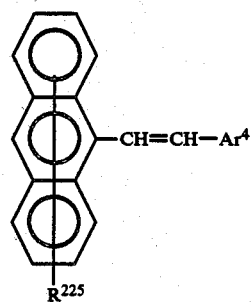
(5)

wherein $R^{225}$ represents hydrogen or halogen; and Ar⁴ represents an unsubstituted or substituted phenyl group, an unsubstituted or substituted naphthyl group, an unsubstituted or substituted anthryl group or an unsubstituted or substituted carbazolyl group.

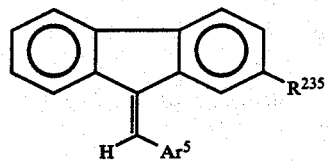
(6)

wherein $R^{235}$ represents hydrogen, halogen, a cyano group, an alkoxyl group having 1 to 4 carbon atoms, or an alkyl group having 1 to 4 carbon atoms; Ar⁵ represents

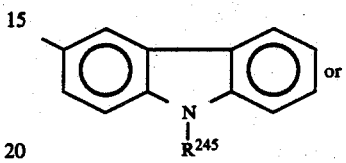 or

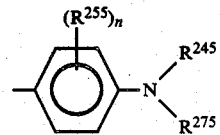

wherein $R^{245}$ represents an alkyl group having 1 to 4 carbon atoms; $R^{255}$ represents hydrogen, halogen, an alkyl group having 1 to 4 carbon atoms, an alkoxyl group having 1 to 4 carbon atoms, or a dialkylamino group; n is an integer of 1 or 2, and when n is 2, each $R^{255}$ may be the same or different; and $R^{265}$ and $R^{275}$ each represent hydrogen, an unsubstituted or substituted alkyl group having 1 to 4 carbon atoms, or an unsubstituted or substituted benzyl group.

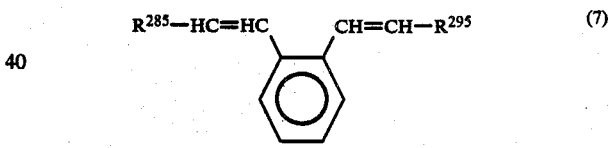
(7)

wherein $R^{285}$ and $R^{295}$ each represent a carbazolyl group, a pyridyl group, a thienyl group, an indolyl group, a furyl group, an unsubstituted or substituted phenyl group, an unsubstituted or substituted styryl group, an unsubstituted or substituted naphthyl group, an unsubstituted or substituted anthryl group, which may have a substituent selected from the group consisting of a dialkylamino group, an alkyl group, an alkoxyl group, a carboxyl group or an ester thereof, halogen, a cyano group, an aralkylamino group, an N-alkyl-N-aralkylamino group, an amino group, a nitro group and an acetylamino group.

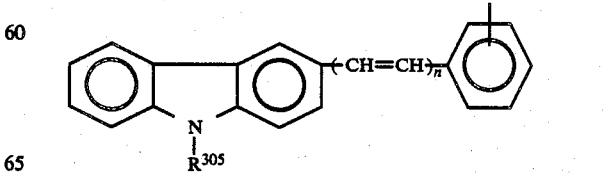
(8)

wherein $R^{305}$ represents a lower alkyl group or a benzyl group; $R^{315}$ represents hydrogen, a lower alkyl group, a lower alkoxyl group, halogen, a nitro group, an amino group which may have as a substituent a lower alkyl group or a benzyl group, and n is an integer of 1 or 2.

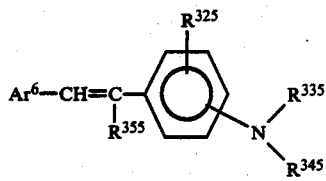
(9)

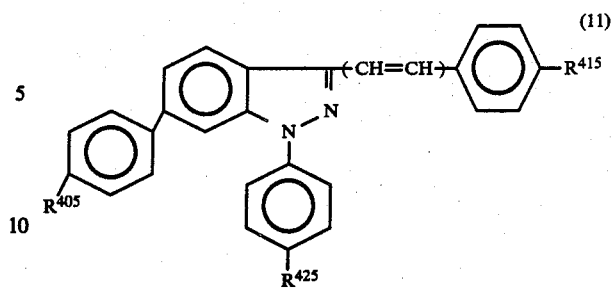
(11)

wherein R³²⁵ represents hydrogen, an alkyl group, an alkoxyl group or halogen; R³³⁵ and R³⁴⁵ each represent an alkyl group, an unsubstituted or substituted aralkyl group, or an unsubstituted or substituted aryl group; R³⁵⁵ represents hydrogen or an unsubstituted or substituted phenyl group or naphthyl group, and Ar⁶ represents a phenyl group or a naphthyl group.

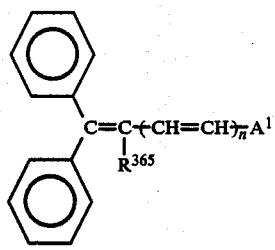
(10)

wherein n is an integer of 0 or 1; R³⁶⁵ represents hydrogen, an alkyl group, or an unsubstituted or substituted phenyl group; A¹ represents

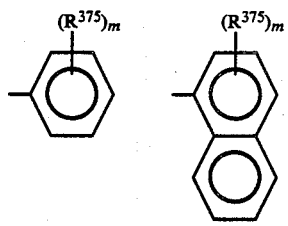

a 9-anthryl group or an unsubstituted or substituted N-alkylcarbazolyl group, wherein R³⁷⁵ represents hydrogen, an alkyl group, an alkoxyl group, halogen, or

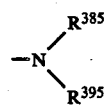

wherein R³⁸⁵ and R³⁹⁵ each represent an alkyl group, or an unsubstituted or substituted aryl group, and R³⁸⁵ and R³⁹⁵ may form a ring in combination; m is an integer of 0, 1, 2 or 3, and when m is 2 or more, each R³⁷⁵ may be the same or different.

wherein R⁴⁰⁵, R⁴¹⁵ and R⁴²⁵ each represent hydrogen, a lower alkyl group, a lower alkoxyl group, a dialkylamino group, or halogen; and n is an integer of 0 or 1.

Specific examples of the compound represented by the above general formula (1) are 9-ethylcarbazole-3-aldehyde 1-methyl-1-phenylhydrazone, 9-ethylcarbazole-3-aldehyde 1-benzyl-1-phenylhydrazone, and 9-ethylcarbazole-3-aldehyde 1,1-diphenylhydrazone.

Specific examples of the compound represented by the general formula (2) are 4-diethylaminosytrene-β-aldehyde 1-methyl-1-phenylhydrazone, and 4-methoxynaphthalene-1-aldehyde 1-benzyl-1-phenylhydrazone.

Specific examples of the compound represented by the general formula (3) are 4-methoxybenzaldehyde 1-methyl-1-phenylhydrazone, 2,4-dimethoxybenzaldehyde 1-benzyl-1-phenylhydrazone, 4-diethylaminobenzaldehyde 1,1-diphenylhydrazone, 4-methoxybenzaldehyde 1-benzyl-1(4-methoxy) phenylhydrazone, 4-diphenylaminobenzaldehyde 1-benzyl-1-phenylhydrazone, and 4-dibenzylaminobenzaldehyde 1,1-diphenylhydrazone.

Specific examples of the compound represented by the general formula (4) are 1,1-bis(4-dibenzylaminophenyl) propane, tris(4-diethylaminophenyl)methane, 1,1-bis(4-dibenzylaminophenyl)propane, and 2,2'-dimethyl-4,4'-bis(diethylamino)-triphenylmethane.

Specific examples of the compound represented by the general formula (5) are 9-(4-diethylaminostyryl)anthrancene, and 9-bromo-10-(4-diethylaminostyryl)anthracene.

Specific examples of the compound represented by the general formula (6) are 9-(4-dimethylaminobenzylidene) fluorene, and 3-(9-fluorenylidene)-9-ethylcarbazole.

Specific examples of the compound represented by the general formula (7) are 1,2-bis(4-diethylaminostyryl) benzene, and 1,2-bis(2,4-dimethoxystyryl)benzene.

Specific examples of the compound represented by the general formula (8) are 3-styryl-9-ethylcarbazole, and 3-(4-methoxystyryl)-9-ethylcarbazole.

Specific examples of the compound represented by the general formula (9) are 4-diphenylaminostilbene, 4-dibenzylamionstilbene, 4-ditolylaminostilbene, 1-(4-diphenylaminostyryl)naphthalene, and 1-(4-diethylaminostyryl)naphthalene.

Specific examples of the compound represented by the general formula (10) are 4'-diphenylamino-α-phenylstilbene, and 4'-methylphenylamino-α-phenylaminostilbene.

Specific examples of the compound represented by the general formula (11) are 1-phenyl-3-(4-diethylaminostyryl)-5-(4-dethylaminophenyl)pyrazoline, and 1-phenyl-3-(4-dimethylaminostyryl)-5-(4-dimethylaminophenyl)pyrazoline.

As other positive hole transporting materials, there are, for example, oxadiazole compounds such as 2,5-bis(4-diethylaminophenyl)-1,3,4-oxadiazole, 2,5-bis[4-(4-diethylaminostyryl)phenyl]-1,3,4-oxadiazole, 2-(9-ethylcarbazolyl-3-)-5-(4-diethylaminophenyl)-1,3,4-oxadiazole; and oxazole compounds such as 2-vinyl-4-(2-chlorophenyl)-5-(4-diethylaminophenyl)oxazole, and 2-(4-diethylaminophenyl)-4-phenyloxazole. In addition, polymeric compounds such as poly-N-vinylcarbazole, polyvinyl pyrene, polyvinyl anthracene, pyrene-formaldehyde resin, and ethylcarbazole-formaldehyde resin can be employed.

As electron transporting materials, there are, for example, chloranil, broanil, tetracyanoethylene, tetracyanoquinone dimethane, 2,4,7-trinitro-9-fluorenone, 2,4,5,7-tetranitro-9-fluorenone, 2,4,5,7-tetranitroxanthone, 2,4,8-trinitrothioxanthone, 2,6,8-trinitro-4H-indeno [1,2-b]thiophene-4-one, and 1,3,7-trinitrodibenzothiophene-5,5-dioxide. These electron transporting materials can be employed alone and in combination.

In the electrophotographic photoconductors according to the present invention, an adhesive layer or a barrier layer may be interposed between the electroconductive support and the photoconductive layer when necessary. The materials suitable for preparing the adhesive layer or barrier layer are polyamide, nitrocellulose and aluminum oxide. It is preferable that the thickness of the adhesive layer or barrier layer be 1 $\mu$m or less.

The electrophotographic photoconductor as shown in FIG. 1 can be prepared by depositing an azo pigment on an electroconductive support in vacuum by a vacuum deposition method as described in U.S. Pat. No. 3,973,959 and U.S. Pat. No. 3,996,049, or by coating on the electroconductive support a dispersion of a finely-divided azo pigment dispersed in an appropriate solvent, with a binder agent dissolved therein when necessary, and drying the coated dispersion, and when necessary, subjecting the surface of the coated layer to buffing as disclosed in Japanese Laid-Open Patent Application No. 51-90827, or with the thickness of the coated layer adjusted appropriately, and finally by coating a solution of a charge transporting material and a binder agent on the coated layer and drying the coated solution.

The electrophotographic photoconductor as shown in FIG. 2 can be prepared by dispersing a finely-divided azo pigment in a solution in which a charge transporting material and a binder agent are dissolved to form a dispersion, coating the dispersion on an electroconductive support, and drying the coated dispersion.

In any of the electrophotographic photoconductors according to the present invention, it is preferable that the azo pigments are pulverized to a particle size of 5 $\mu$m or less, more preferably 2 $\mu$m or less, when used. The coating of such azo pigments can be performed by the conventional means, such as a doctor blade and a wire bar, or by the conventional dipping method.

Copying by use of the electrophotographic photoconductors according to the present invention can be performed by a process comprising the steps of uniformly charging the surface of the photoconductive layer to a predetermined potential in the dark, exposing the uniformly charged photoconductive layer to a light image to form a latent electrostatic image on the photoconductive layer, and developing the latent electrostatic image with a developer to a visible image, and when necessary by transferring the developed visible image to a transfer sheet such a sheet of paper, and by fixing the transferred image to the transfer sheet.

Examples of electrophotographic photoconductors according to the present invention will now be explained in detail, which are given for illustration of the present invention and are not intended to be limiting thereof.

EXAMPLE 1

76 parts by weight of a triazo pigment (Compound No. 72), 1260 parts by weight of a tetrahydrofuran solution of a polyester resin (Trademark "Vylon 200" made by Toyobo Company, Ltd.) with the amount of the solid components contained therein being 2%, and 3700 parts by weight of tetrahydrofuran were dispersed and ground in a ball mill. The thus prepared dispersion was coated on an aluminum surface of an aluminum-deposited polyester film by a doctor blade, and dried at room temperature, so that a charge generation layer having a thickness of about 1 $\mu$m was formed on the aluminum-deposited polyester film.

Furthermore, 2 parts by weight of 9-ethylcarbazole-3-aldehyde 1-methyl-phenylhydrazone serving as charge transporting material, 2 parts by weight of a polycarbonate resin (Trademark "Panlite K-1300" made by Teijin Limited) and 16 parts by weight of tetrahydrofuran were mixed to form a solution. This solution was coated on the above formed charge generating layer by a doctor blade and then dried at 80° C. for 2 minutes, and then at 105° C. for 5 minutes, so that a charge transport layer having a thickness of about 20 $\mu$m was formed on the charge generation layer. Thus a layered type electrophotographic photoconductor No. 1 according to the present invention as shown in FIG. 1 was prepared.

EXAMPLES 2 TO 40

Example 1 was repeated except that the trisazo pigment (Compound No. 72) employed in Example 1 was replaced by the azo pigments listed in the following Table 1, whereby electrophotographic photoconductors No. 2 to No. 40 according to the present invention were prepared.

EXAMPLES 41 TO 49

Example 1 was repeated except that 9-ethylcarbazole-3-aldehyde 1-methyl-1-phneylhydrazone employed as charge transporting material in Example 1 was replaced by 1-phenyl-3-(4-diethylaminostyryl)-5-(4-diethylaminophenyl) pyrazoline and the trisazo pigment (Compound No. 72) employed in Example 1 was replaced with by the azo pigments listed in the following Table 1, whereby electrophotographic photoconductors No. 41 to No. 49 according to the present invention were prepared.

EXAMPLES 50 TO 75

Example 1 was repeated except that 9-ethylcarbazole-3-aldehyde 1-methyl-1-phneylhydrazone employed as charge transporting material in Example 1 was replaced by $\alpha$-phenyl-4'-N,N-diphenylaminostilbene and the trisazo pigment (Compound No. 72) employed in Example 1 was replaced by the azo pigments listed in the following Table 1, whereby electrophotographic photoconductors No. 50 to No. 75 according to the present invention were prepared.

EXAMPLES 76 TO 94

Example 1 was repeated except that 9-ethylcarbazole-3-aldehyde 1-methyl-1-phneylhydrazone employed as charge transporting material in Example 1 was replaced by 1,1-bis(4-dibenzylaminophenyl)propane and the trisazo pigment (Compound No. 72) employed in Example 1 was replaced by the azo pigments listed in the following Table 1, whereby electrophotographic photoconductors No. 76 to No. 94 according to the present invention were prepared.

With each of the electrophotographic photoconductors No. 1 through No. 94 according to the present invention, the surface of the photoconductive layer was charged negatively in the dark under application of $-6$ KV of corona charge for 20 seconds by a commercially available electrostatic copying sheet testing apparatus (Paper Analyzer SP428 made by Kawaguchi Electro Works Co., Ltd.), and then allowed to stand in the dark for 20 seconds without applying any charge thereto, and the surface potential Vpo(V) of the photoconductor was measured. The photoconductor was then illuminated by a tungusten lamp in such a manner that the illuminance on the illuminated surface of the photoconductor was 4.5 lux, and the exposure $E_{\frac{1}{2}}$(lux·sec) required to reduce the initial surface potential Vpo(V) to ½ the initial surface potential Vpo(V) was measured. The results are shown in Table 1-1~1-5.

TABLE 1

| Photoconductor No. | Compound No. | $V_{PO}$ (V) | $E_{\frac{1}{2}}$ (Lux · sec) |
| --- | --- | --- | --- |
| 1 | 72 | −858 | 0.4 |
| 2 | 13 | −892 | 0.8 |
| 3 | 78 | −584 | 0.8 |
| 4 | 79 | −694 | 0.5 |
| 5 | 73 | −610 | 0.6 |
| 6 | 74 | −560 | 3.9 |
| 7 | 71 | −448 | 0.5 |
| 8 | 68 | −1240 | 1.9 |
| 9 | 82 | −398 | 0.8 |
| 10 | 75 | −462 | 0.6 |
| 11 | 19 | −832 | 0.4 |
| 12 | 25 | −925 | 0.3 |
| 13 | 31 | −911 | 1.0 |
| 14 | 88 | −876 | 0.4 |
| 15 | 104 | −921 | 1.3 |
| 16 | 120 | −733 | 0.5 |
| 17 | 7 | −1136 | 1.8 |
| 18 | 59 | −1024 | 1.6 |
| 19 | 56 | −934 | 3.4 |
| 20 | 57 | −990 | 3.0 |
| 21 | 58 | −1120 | 1.8 |
| 22 | 62 | −738 | 1.5 |
| 23 | 1 | −1132 | 4.8 |
| 24 | 14 | −1170 | 1.8 |
| 25 | 8 | −1028 | 1.1 |
| 26 | 171 | −638 | 1.6 |
| 27 | 152 | −950 | 0.8 |
| 28 | 153 | −1128 | 3.4 |
| 29 | 154 | −1294 | 1.8 |
| 30 | 158 | −916 | 4.3 |
| 31 | 20 | −923 | 3.0 |
| 32 | 26 | −955 | 2.1 |
| 33 | 32 | −831 | 1.8 |
| 34 | 9 | −674 | 1.2 |
| 35 | 3 | −586 | 1.4 |
| 36 | 248 | −866 | 1.3 |
| 37 | 249 | −496 | 0.6 |
| 38 | 21 | −796 | 3.1 |
| 39 | 27 | −825 | 1.8 |
| 40 | 33 | −733 | 2.0 |
| 41 | 74 | −368 | 1.7 |
| 42 | 68 | −744 | 1.1 |
| 43 | 56 | −678 | 2.2 |
| 44 | 57 | −720 | 2.5 |
| 45 | 62 | −442 | 0.7 |
| 46 | 1 | −750 | 2.7 |
| 47 | 153 | −490 | 2.0 |
| 48 | 154 | −648 | 0.9 |
| 49 | 158 | −680 | 2.7 |
| 50 | 13 | −962 | 2.0 |
| 51 | 78 | −590 | 4.5 |
| 52 | 79 | −984 | 3.0 |
| 53 | 72 | −954 | 1.5 |
| 54 | 73 | −660 | 2.8 |
| 55 | 70 | −628 | 0.4 |
| 56 | 71 | −444 | 0.6 |
| 57 | 82 | −376 | 2.6 |
| 58 | 75 | −452 | 0.9 |
| 59 | 59 | −1102 | 4.0 |
| 60 | 56 | −870 | 3.6 |
| 61 | 57 | −1034 | 3.3 |
| 62 | 14 | −1186 | 1.6 |
| 63 | 8 | −1194 | 1.3 |
| 64 | 171 | −736 | 3.0 |
| 65 | 168 | −862 | 0.6 |
| 66 | 169 | −862 | 3.0 |
| 67 | 152 | −1203 | 1.1 |
| 68 | 154 | −1364 | 2.8 |
| 69 | 115 | −1058 | 1.3 |
| 70 | 3 | −802 | 4.3 |
| 71 | 263 | −526 | 1.5 |
| 72 | 248 | −1102 | 3.0 |
| 73 | 249 | −1090 | 1.2 |
| 74 | 253 | −768 | 2.1 |
| 75 | 12 | −451 | 0.4 |
| 76 | 13 | −1060 | 2.1 |
| 77 | 72 | −1064 | 2.9 |
| 78 | 73 | −836 | 3.7 |
| 79 | 70 | −980 | 0.9 |
| 80 | 71 | −682 | 1.4 |
| 81 | 69 | −418 | 0.6 |
| 82 | 75 | −640 | 1.4 |
| 83 | 57 | −1138 | 3.4 |
| 84 | 14 | −1420 | 3.2 |
| 85 | 8 | −1380 | 2.2 |
| 86 | 168 | −1204 | 1.0 |
| 87 | 152 | −1400 | 1.9 |
| 88 | 154 | −1506 | 3.5 |
| 89 | 15 | −1214 | 2.4 |
| 90 | 263 | −598 | 2.8 |
| 91 | 249 | −1352 | 1.8 |
| 92 | 253 | −918 | 3.9 |
| 93 | 6 | −1054 | 0.9 |
| 94 | 12 | −637 | 0.5 |

Figure 5:
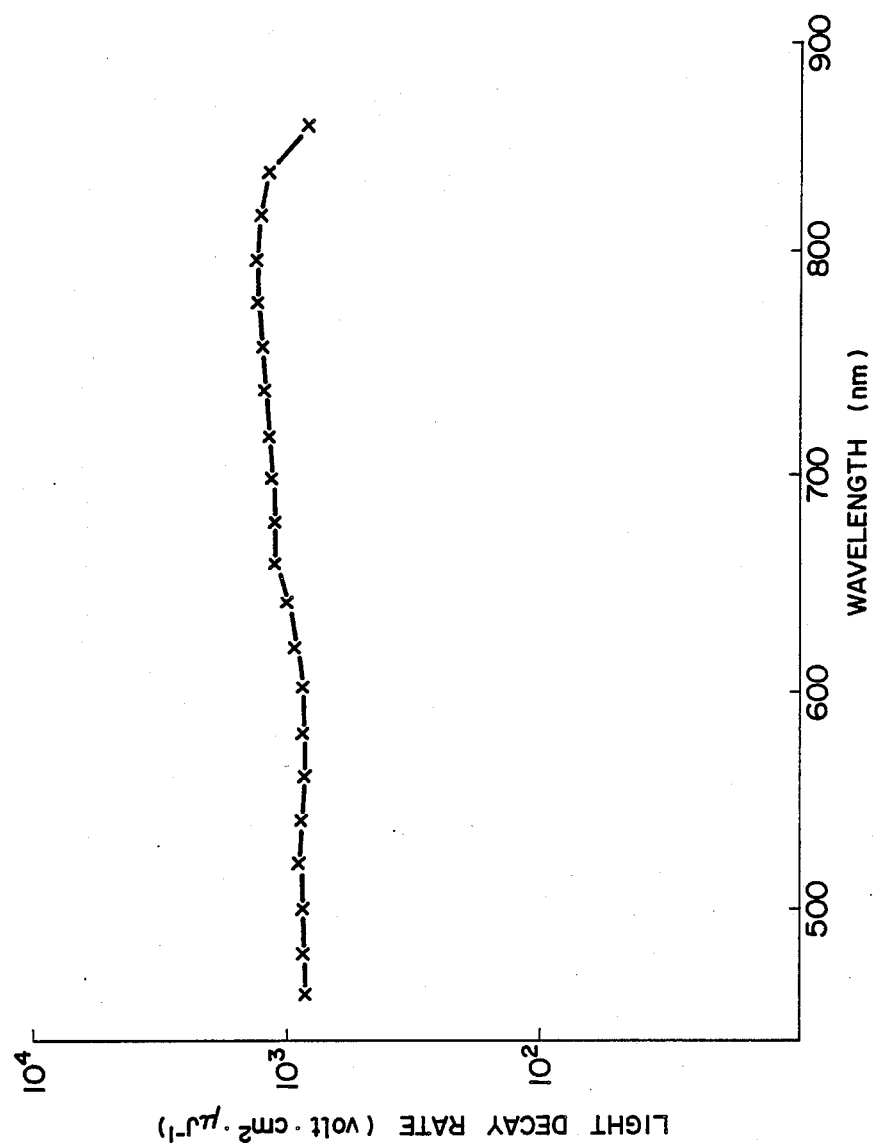
FIG. 5 is a graph showing the spectrosensitivity of the electrophotographic photoconductor as shown in FIG. 1 according to the present invention.

In order to investigate the photosensitive wavelength range of the electrophotographic photoconductor No. 1 according to the present invention, its spectrosensitivity was measured as follows:

The surface of the photoconductor was charged negatively in the dark until its surface potential amounted to more than $-800$ V, and then subjected to dark dacy until its surface potential decreased to $-800$ V. At that moment, the surface of the photoconductor was exposed to a monochromic light having an intensity of 1 $\mu W/cm^2$ at the surface of the photoconductor by use of a monochrometer, so that the time (seconds) required for the surface potential to decrease to $-400$ V was obtained, from which its half-value exposure ($\mu W \cdot sec/cm^2$) was calculated. Further, from the apparent potential difference of 400 V obtained by the exposure to the monochromic light, a decrease in the surface potential corresponding to the dark decay thereof which took place during the exposure was deducted, whereby the actual difference of the surface potential was obtained. From this actual difference of the surface potential and the above half-value exposure, the light decay rate (Volt·cm$^2$·$\mu W^{-1}$·sec$^{-1}$) of the photoconductor was calculated, whereby the spectrosensitivity curve as shown in FIG. 5 was obtained.

EXAMPLE 95

7.5 parts by weight of a bisazo pigment (II-C-26), and 500 parts by weight of a tetrahydrofuran solution of a polyester resin (Trademark "Vylon 200" made by Toyobo Company, Ltd.) with the amount of the solid components contained therein being 0.5%, were dispersed and ground in a ball mill. The thus prepared dispersion was coated on an aluminum surface of an aluminum-deposited polyester film by a doctor blade, and dried at room temperature, so that a charge generation layer having a thickness of about 1 μm was formed on the aluminum-deposited polyester film.

Furthermore, 2 parts by weight of 9-ethylcarbazole-3-aldehyde 1-methyl-phenylhydrazone serving as charge transporting material, 2 parts by weight of a polycarbonate resin (Trademark "Panlite K-1300" made by Teijin Limited) and 16 parts by weight of tetrahydrofuran were mixed to form a solution. This solution was coated on the above formed charge generating layer by a doctor blade and then dried at 80° C. for 2 minutes, and then at 105° C. for 5 minutes, so that a charge transport layer with a thickness of about 20 μm was formed on the charge generation layer. Thus a layered type electrophotographic photoconductor No. 95 according to the present invention as shown in FIG. 1 was prepared.

EXAMPLES 96 TO 106

Example 95 was repeated except that the bisazo pigment (II-C-26) employed in Example 95 was replaced by the bisazo pigments listed in the following Table 2-1, whereby electrophotographic photoconductors No. 96 to No. 106 according to the present invention were prepared.

EXAMPLES 107 TO 114

Example 95 was repeated except that 9-ethylcarbazole-3-aldehyde 1-methyl-1-phneylhydrazone employed as charge transporting material in Example 95 was replaced with 1-phenyl-3-(4-diethylaminostyryl)-5-(4-diethylaminophenyl) pyrazoline and the bisazo pigment (II-C-26) employed in Example 95 was replaced by the bisazo pigments listed in the following Table 2-1, whereby electrophotographic photoconductors No. 107 to No. 114 according to the present invention were prepared.

EXAMPLES 115 TO 126

Example 95 was repeated except that 9-ethylcarbazole-3-aldehyde 1-methyl-1-phneylhydrazone employed as charge transporting material in Example 95 was replaced with α-phenyl-4'-N,N-diphenylaminostilbene and the bisazo pigment (II-C-26) employed in Example 95 was replaced by the azo pigments listed in the following Table 2-2, whereby electrophotographic photoconductors No. 115 to No. 126 according to the present invention were prepared.

EXAMPLES 127 TO 135

Example 95 was repeated except that 9-ethylcarbazole-3-aldehyde 1-methyl-1-phneylhydrazone employed as charge transporting material in Example 95 was replaced by 1,1-bis(4-dibenzylaminophenyl)propane and the bisazo pigment (II-C-26) employed in Example 95 was replaced with by the azo pigments listed in the following Table 2-2, whereby electrophotographic photoconductors No. 127 to No. 135 according to the present invention were prepared.

With each of the electrophotographic photoconductors No. 95 through No. 135 according to the present invention, the surface of the photoconductive layer was charged negatively in the dark under application of −6 KV of corona charge for 20 seconds by a commercially available electrostatic copying sheet testing apparatus (Paper Analyzer SP428 made by Kawaguchi Electro Works Co., Ltd.), and then allowed to stand in the dark for 20 seconds without applying any charge thereto, and the surface potential Vpo(V) of the photoconductor was measured. The photoconductor was then illuminated by a tungusten lamp in such a manner that the illuminance on the illuminated surface of the photoconductor was 4.5 lux, and the exposure $E_{\frac{1}{2}}$(lux·sec) required to reduce the initial surface potential Vpo(V) to ½ the initial surface potential Vpo(V) was measured. The results are shown in Tables 2-1 and 2-2.

TABLE 2

| Photoconductor No. | Bisazo Pigment | $V_{PO}$ (V) | $E_{\frac{1}{2}}$ (Lux · sec) |
|---|---|---|---|
| 95 | II-C-26 | 825 | 0.79 |
| 96 | II-C-1 | 826 | 1.24 |
| 97 | II-C-39 | 404 | 0.39 |
| 98 | III-C-26 | 831 | 1.34 |
| 99 | III-C-1 | 821 | 2.33 |
| 100 | III-C-39 | 406 | 0.49 |
| 101 | IV-C-3 | 300 | 1.19 |
| 102 | IV-C-26 | 298 | 2.05 |
| 103 | IV-C-1 | 731 | 3.60 |
| 104 | I-C-40 | 920 | 0.92 |
| 105 | V-C-39 | 320 | 2.81 |
| 106 | II-C-60 | 980 | 0.52 |
| 107 | II-C-26 | 225 | 0.39 |
| 108 | II-C-1 | 394 | 0.86 |
| 109 | III-C-26 | 207 | 0.53 |
| 110 | III-C-1 | 292 | 0.65 |
| 111 | IV-C-26 | 169 | 0.63 |
| 112 | IV-C-1 | 328 | 0.86 |
| 113 | I-C-15 | 480 | 0.58 |
| 114 | V-C-4 | 475 | 0.60 |
| 115 | II-C-26 | 924 | 1.73 |
| 116 | II-C-1 | 897 | 4.35 |
| 117 | II-C-39 | 510 | 0.59 |
| 118 | III-C-26 | 880 | 4.11 |
| 119 | III-C-1 | 793 | 6.59 |
| 120 | III-C-39 | 410 | 1.06 |
| 121 | IV-C-3 | 272 | 1.69 |
| 122 | IV-C-26 | 332 | 5.10 |
| 123 | IV-C-1 | 568 | 4.94 |
| 124 | I-C-40 | 980 | 0.92 |
| 125 | II-C-45 | 720 | 0.48 |
| 126 | II-C-50 | 690 | 0.71 |
| 127 | II-C-26 | 1109 | 3.35 |
| 128 | II-C-1 | 913 | 8.73 |
| 129 | II-C-39 | 725 | 1.36 |
| 130 | III-C-26 | 1101 | 5.83 |
| 131 | III-C-1 | 965 | 9.38 |
| 132 | III-C-39 | 746 | 2.82 |
| 133 | IV-C-3 | 693 | 3.32 |
| 134 | IV-C-26 | 402 | 7.34 |
| 135 | IV-C-1 | 958 | 6.35 |

What is claimed is:

1. An electrophotographic photoconductor comprising an electroconductive support and a photoconductive layer formed thereon, said photoconductive layer comprising as a charge generating material an azo pigment having general formula (I):

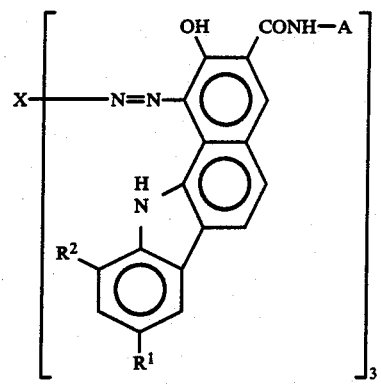

wherein $R^1$ represents H, Cl, $CH_3$, or $OCH_3$; $R^2$ represents H, Cl, or $CH_3$, provided that $R^1$ and $R^2$ may not be hydrogen at the same time; A represents

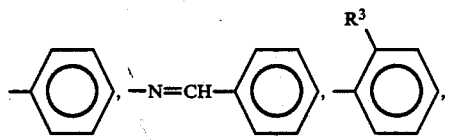

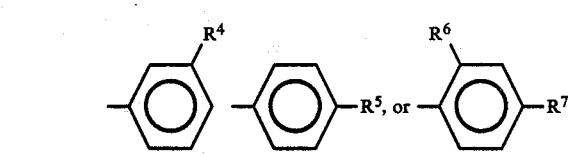

wherein $R^3$ represents a lower alkyl group or a nitro group; $R^4$ represents a lower alkyl group, a lower alkoxyl group or Cl; $R^5$ represents a lower alkyl group, a lower alkoxyl group, Cl or a nitro group; and $R^6$ and $R^7$ each represent a lower alkyl group or Cl; and X represents

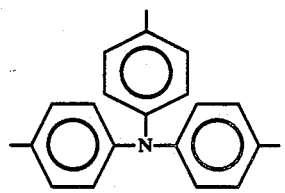

2. The electrophotographic photoconductor as claimed in claim 1 wherein, in general formula (I), $R^1$ is H or Cl; $R^2$ is H, Cl or $CH_3$, provided that $R^1$ and $R^2$ may not be hydrogen at the same time; and A is

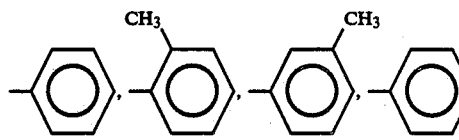

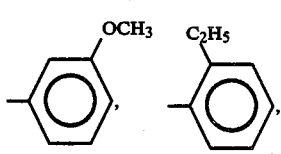

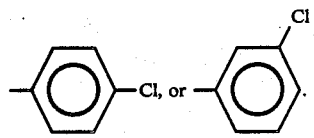

3. An electrophotographic photoconductor comprising an electroconductive support and a photoconductive layer formed thereon, said photoconductive layer comprising as a charge generating material an azo pigment having general formula (II):

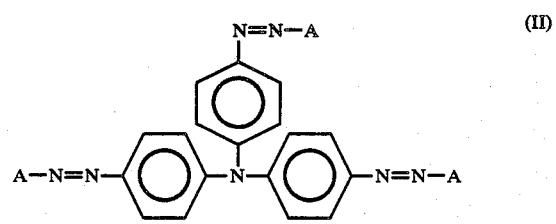

(II)

wherein A represent

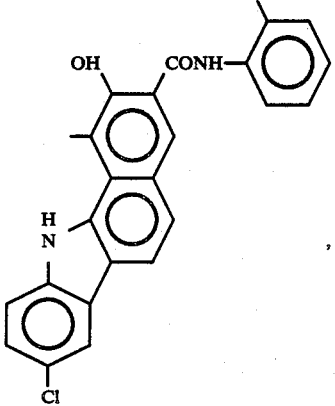

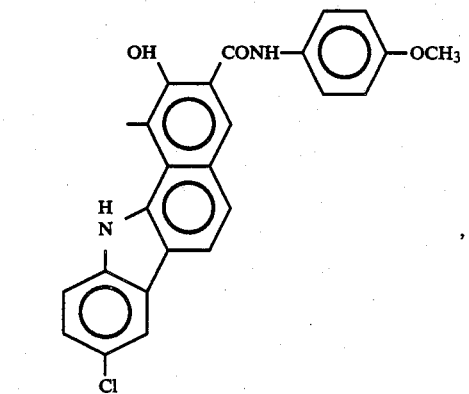

-continued

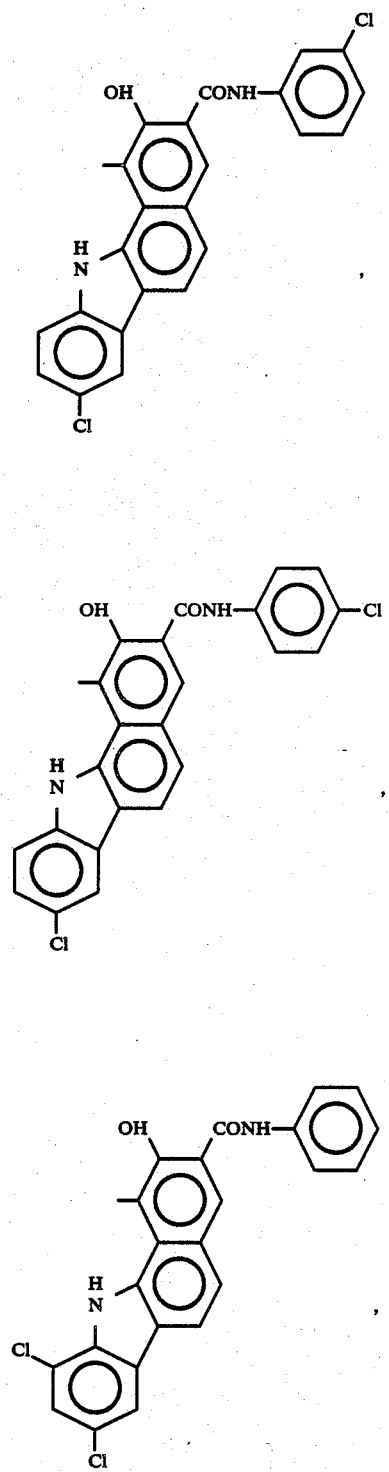

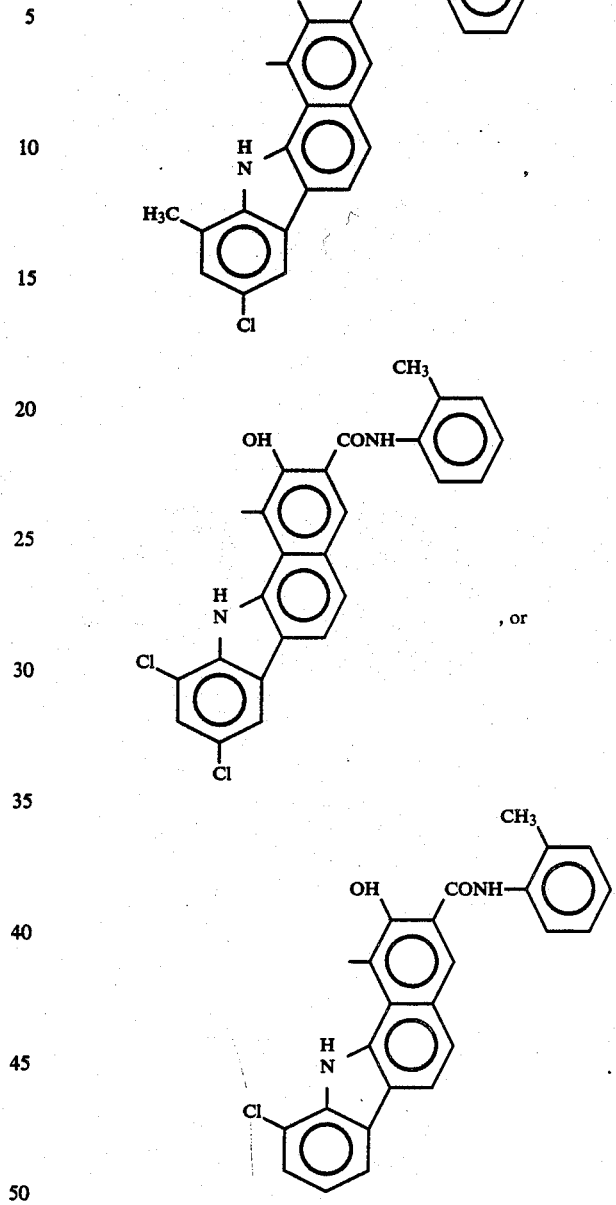

, or

4. The electrophotographic photoconductor as claimed in claim 1, wherein said photoconductive layer comprises a charge generation layer and a charge transport layer which are overlaid on said electroconductive support, and said azo pigment is contained in said charge generation layer.

5. The electrophotographic photoconductor as claimed in claim 3, wherein said photoconductive layer comprises a charge generation layer and a charge transport layer which are overlaid on said electroconductive support, and said azo pigment is contained in said charge generation layer.

* * * * *

UNITED STATES PATENT AND TRADEMARK OFFICE
CERTIFICATE OF CORRECTION

PATENT NO. : 4,916,039

DATED : April 10, 1990

INVENTOR(S) : Hashimoto et al.

It is certified that error appears in the above-identified patent and that said Letters Patent is hereby corrected as shown below:

Column 4, line 12, " (m = 2-6) " should read -- (n = 2-6) --;

line 67, "and and an" should read --and an--;

line 67, "hydrgensulfite" should read --hydrogensulfite--.

Column 6, line 45, " 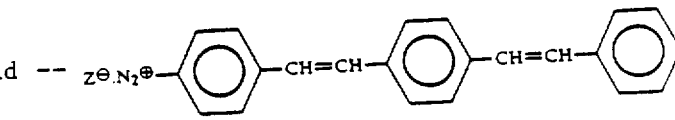 "

should read -- 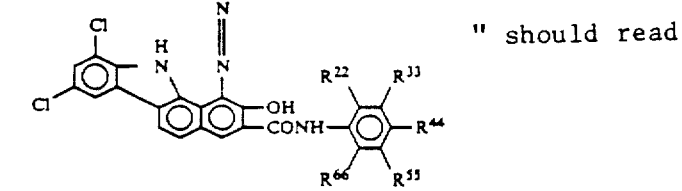 --.

Column 7, line 9, "group" should read --group.--.

Column 13, first table, second column, insert heading --$R^{22}$--.

Column 17, line 22, " 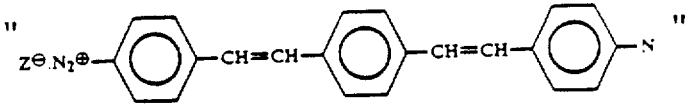 " should read

-- 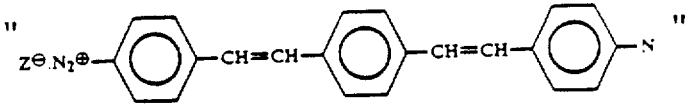 --.

UNITED STATES PATENT AND TRADEMARK OFFICE
CERTIFICATE OF CORRECTION

PATENT NO. : 4,916,039

DATED : April 10, 1990

INVENTOR(S) : Hashimoto et al.

It is certified that error appears in the above-identified patent and that said Letters Patent is hereby corrected as shown below:

Column 40, line 49, "phneylhydrazone" should read --phenylhydrazone--;

line 61, "phneylhydrazone" should read --phenylhydrazone--.

Column 41, line 4, "phneylhydrazone" should read --phenylhydrazone--;

line 23, "tungusten" should read --tungsten--.

Column 42, line 50, "dacy" should read --decay--.

Column 43, line 40, "phneylhydrazon" should read --phenylhydrazone--;

line 52, "phneylhydrazone" should read --phenylhydrazone--;

line 63, "phneylhydrazone" should read --phenylhydrazone--.

Column 44, line 15, "tungusten" should read --tungsten--.

Signed and Sealed this

Fifteenth Day of October, 1991

*Attest:*

HARRY F. MANBECK, JR.

*Attesting Officer*  *Commissioner of Patents and Trademarks*